(12) United States Patent
Echizen et al.

(10) Patent No.: US 7,478,432 B2
(45) Date of Patent: Jan. 13, 2009

(54) METHOD AND SYSTEM FOR CONTENTS CONTROL

(75) Inventors: Isao Echizen, Yokohama (JP); Hiroshi Yoshiura, Tokyo (JP); Kunihiko Miyazaki, Yokohama (JP); Kousuke Anzai, Kawasaki (JP); Jun'ichi Taguchi, Sagamihara (JP); Kazunori Nakano, Sagamihara (JP); Katsuyuki Okeya, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1016 days.

(21) Appl. No.: 10/066,713

(22) Filed: Feb. 6, 2002

(65) Prior Publication Data

US 2002/0188840 A1 Dec. 12, 2002

(30) Foreign Application Priority Data

| Jun. 7, 2001 | (JP) | 2001-172727 |
| Jun. 14, 2001 | (JP) | 2001-179501 |
| Jul. 5, 2001 | (JP) | 2001-204310 |
| Aug. 8, 2001 | (JP) | 2001-240080 |
| Nov. 8, 2001 | (JP) | 2001-342659 |

(51) Int. Cl.
*G06F 7/04* (2006.01)
*G06F 12/14* (2006.01)
*H04N 7/16* (2006.01)
*H04L 9/00* (2006.01)

(52) U.S. Cl. ............... 726/26; 726/27; 726/31; 705/51; 713/176

(58) Field of Classification Search ............. 726/26, 726/31
See application file for complete search history.

(56) References Cited

U.S. PATENT DOCUMENTS

| 5,689,559 | A | * | 11/1997 | Park ........................... 380/203 |
| 5,968,133 | A | * | 10/1999 | Latham et al. ............... 709/248 |
| 6,226,618 | B1 | * | 5/2001 | Downs et al. .................. 705/1 |
| 6,320,829 | B1 | * | 11/2001 | Matsumoto et al. ....... 369/47.12 |
| 6,321,339 | B1 | * | 11/2001 | French et al. .................. 726/2 |
| 6,363,357 | B1 | * | 3/2002 | Rosenberg et al. ............ 705/26 |

(Continued)

OTHER PUBLICATIONS

I.Echizen, H.Yoshiura, T.Arai, H.Kimura and T.Takeuchi, "General Quality Maintenance Module for Motion Picture Watermarking", IEEE Transactions on Consumer Electronics, vol. 45, No. 4, pp. 1150-1158, Nov. 1999.

(Continued)

*Primary Examiner*—Christopher A Revak
*Assistant Examiner*—Matthew T Henning
(74) *Attorney, Agent, or Firm*—Mattingly, Stanger, Malur & Brundidge, P.C.

(57) ABSTRACT

A contents control method for controlling a process on the receiving side which is applied to contents transmitted from the transmitting side to the receiving side, includes a step of adding, when a predetermined block of the transmitted contents is an area where control information for controlling the process substance on the receiving side which is applied to the contents is added, the control information to the block. The method also includes a step of receiving a process designation concerning the transmitted contents, and a step of applying, when user information stored in a receiving side apparatus which receives the transmitted contents, or information concerning the receiving side apparatus satisfies conditions corresponding to the received process designation in the control information added to the block of the contents, a process corresponding to the process designation to the received block.

25 Claims, 14 Drawing Sheets

U.S. PATENT DOCUMENTS

| | | | |
|---|---|---|---|
| 6,370,319 B1 * | 4/2002 | Matsumoto et al. | 386/94 |
| 6,372,974 B1 * | 4/2002 | Gross et al. | 84/609 |
| 6,622,249 B1 * | 9/2003 | Komuro et al. | 726/31 |
| 6,766,305 B1 * | 7/2004 | Fucarile et al. | 705/51 |
| 6,772,133 B1 * | 8/2004 | Kambayashi et al. | 705/57 |
| 6,772,209 B1 * | 8/2004 | Chernock et al. | 709/225 |
| 6,772,340 B1 * | 8/2004 | Peinado et al. | 713/168 |
| 6,778,757 B1 * | 8/2004 | Kawamae et al. | 386/94 |
| 6,839,503 B1 * | 1/2005 | Hirai | 386/94 |
| 6,868,494 B1 * | 3/2005 | Shitara et al. | 713/189 |
| 6,976,166 B2 * | 12/2005 | Herley et al. | 713/165 |
| 7,003,110 B1 * | 2/2006 | Jakobsson et al. | 380/45 |
| 7,010,808 B1 * | 3/2006 | Leung et al. | 726/26 |
| 7,134,144 B2 * | 11/2006 | McKune | 726/26 |
| 7,213,266 B1 * | 5/2007 | Maher et al. | 726/26 |
| 7,222,104 B2 * | 5/2007 | Tadayon et al. | 705/54 |
| 2002/0138379 A1 * | 9/2002 | Yuasa et al. | 705/35 |
| 2002/0156742 A1 * | 10/2002 | Ogino et al. | 705/57 |
| 2002/0156743 A1 * | 10/2002 | DeTreville | 705/57 |
| 2003/0135465 A1 * | 7/2003 | Lee et al. | 705/51 |

OTHER PUBLICATIONS

"Request for expressions of interest" on DVD CCA's website (http://www.dvdcca.org/dvdcca/), Copy Protection Technical Working Group, 2001.

Information Technology AT Attachment with Packet Interface-5 (ATA/ATAPI-5 Working Draft, http://www.t13.org/#Project_drafts), pp. 177-178 Feb. 29, 2000.

* cited by examiner

FIG. 5

| CONTENTS ID | PROCESS SUBSTANCE | | CONDITIONS |
|---|---|---|---|
| 000001 | REPRODUCTION | | "LEVEL 1" OR MORE |
| | STORAGE IN NON-PROCES-SIBLE AREA | INSIDE MEMORY | "LEVEL 2" OR MORE |
| | | EXTERNAL UNIT | "LEVEL 3" OR MORE |
| | STORAGE IN PROCESSIBLE AREA | | "LEVEL 4" OR MORE |
| | ATTENDANT DATA DISPLAY | | "LEVEL 2" OR MORE |
| | SELECTION OF CAMERA | CAMERA 1 | "LEVEL 2" OR MORE |
| | | CAMERA 2 | "LEVEL 3" OR MORE |
| | | CAMERA 3 | "LEVEL 4" OR MORE |
| | | ... | ... |
| | BI-DIRECTIONAL COMMUNICATION | | "LEVEL 2" OR MORE |
| | RETRANS-MISSION (TILL TWICE) | NON-PROCES-SIBLE AREA | "LEVEL 5" OR MORE |
| | | PROCESSIBLE AREA | RETRANSMISSION INHIBITION |
| ... | | | ... |

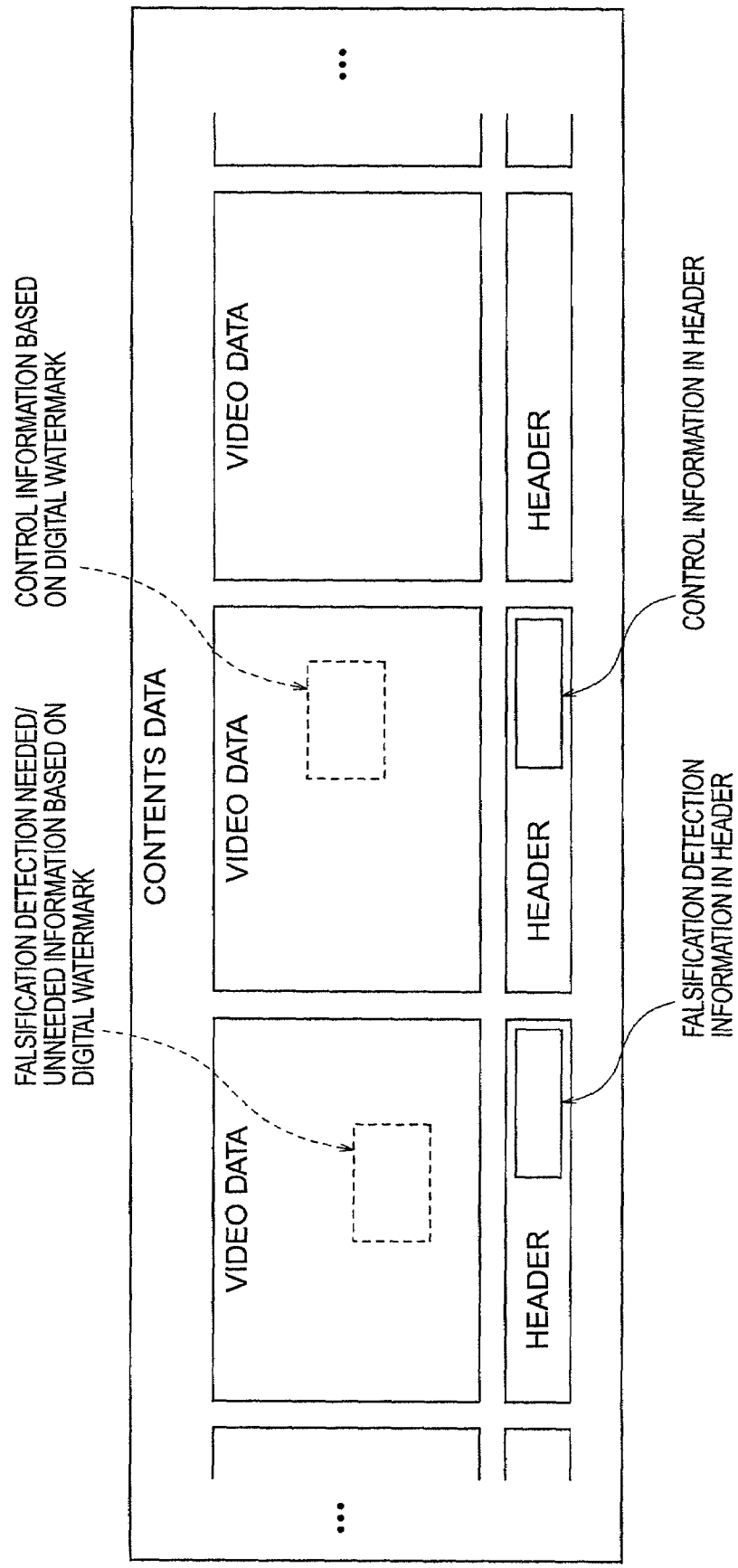

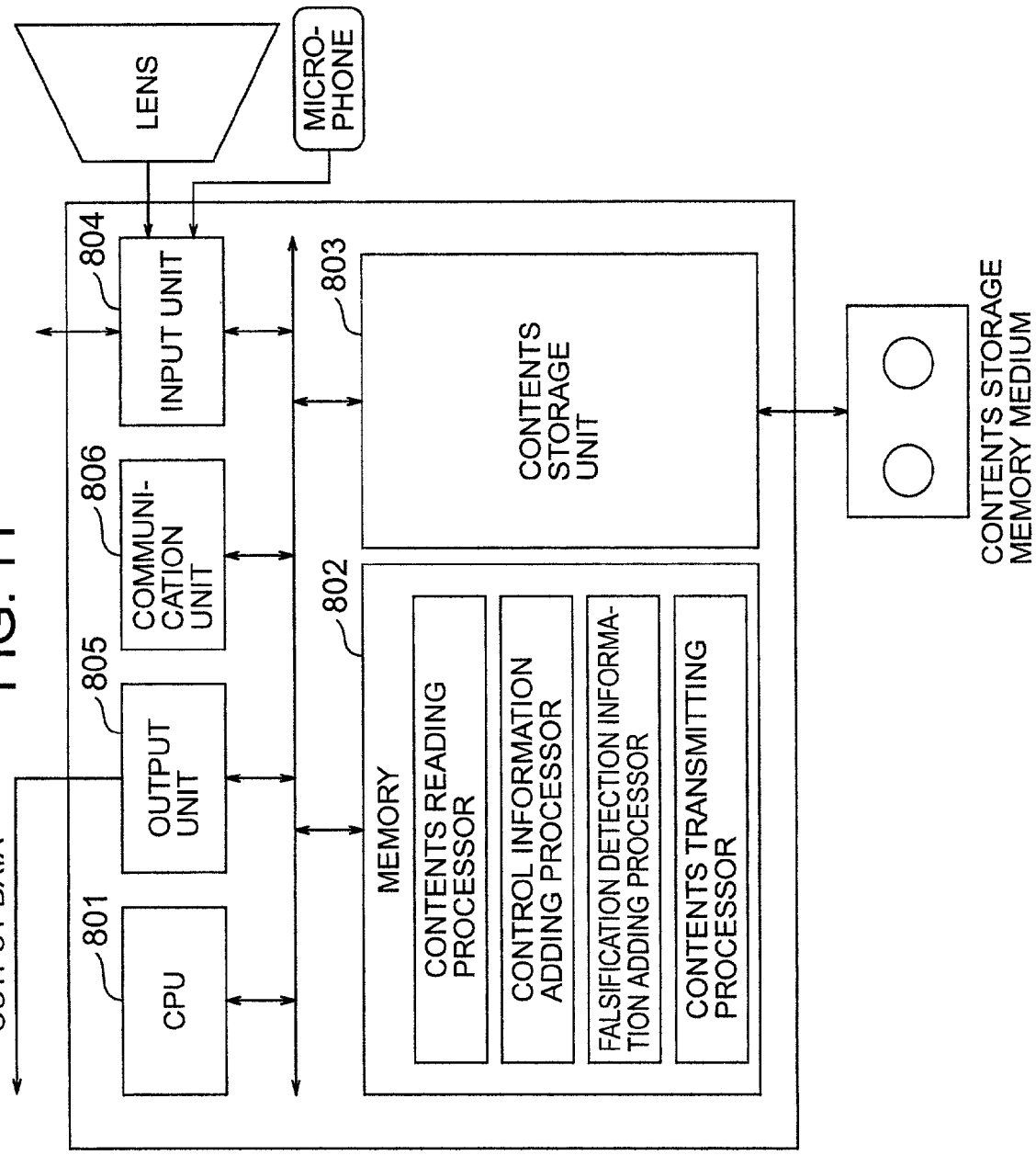

FIG. 12

|  | ADDITION BASED ON DIGITAL WATERMARK | ADDITION TO HEADER |
|---|---|---|
| METHOD 1 | CONTROL NEEDED/ UNNEEDED FLAG | CONTROL INFORMATION |
| METHOD 2 | CONTROL NEEDED/ UNNEEDED FLAG | ELECTRONIC SIGNATURE FOR CONTROL INFORMATION AND CONTENTS MADE BY TRANS-MITTING APPARATUS |
| METHOD 3 | ELECTRONIC SIGNATURE FOR CONTROL INFORMATION MADE BY TRANSMITTING APPARATUS (+ CONTROL NEEDED/UNNEEDED FLAG) | CONTROL INFORMATION |

METHOD AND SYSTEM FOR CONTENTS CONTROL

BACKGROUND OF THE INVENTION

The present invention relates to a contents control system for controlling reproduction and storage of contents, and more particularly to a technique effectively applied to a contents control system for controlling reproduction on the receiving side of contents circulated by a wired network or broadcasting wave, storage of the contents in a recording medium inside a receiving apparatus and retransmission of the contents to another receiving apparatus.

Conventionally, digital contents such as still picture, video data and audio data is presented to users by way of a communication medium such as Internet or digital broadcasting, or a recording medium such as CD-ROM or DVD-ROM. The digital contents as above has such a characteristic that it can be duplicated easily. Accordingly, it is conceivable that the third party can get the contents unfairly or without authorization. Under the circumstances, with a view to enable only persons having authorized right to utilize the contents, reproduction control and copy control of the digital contents utilizing the digital watermark technique have hitherto been proposed.

The digital watermark technique is described in "General Quality Maintenance Module for Motion Picture Watermarking" by I. Echizen, H. Yoshiura, T. Arai, H. Kimura and T. Takeuchi, IEEE Transactions on Consumer Electronics, Vol.45, No.4, pp.1150-1158, November 1999.

Taking image data and video data, for instance, a conventional technique concerning control of such contents is described in "Request for expressions of interest" on DVD CCA's website, Copy Protection Technical Working Group, 2001. In the conventional technique, however, object contents is stored in a medium such as DVD-ROM or DVD-RAM on the presupposition that reproduction of media type contents and control of its copy to a medium are carried out by a dedicated unit such as DVD player and recorder.

On the other hand, by the aid of speedup of network and advance of digital broadcasting technology, the conventional media type contents is forwarded and distributed by way of a broadcasting wave or network. The forwarded contents is received by a personal computer (PC), settop box (STB) or the like, and can be applied with various processes such as playback and edition of the contents, selection of channels of different cameras and bi-directional communication by means of the transmitting/receiving apparatus. While various kinds of processes can be applied to contents on the network and broadcasting wave by the general-purpose transmitting/receiving apparatus as above, the application of the conventional technique for performing only reproduction of media type contents and control of its copy to a medium to the contents transmitting/receiving apparatus on the network and broadcasting wave raises a problem that operation by the user for contents utilization based on rights characteristics is limited and various operations of contents depending on various kinds of rights characteristics become impossible.

SUMMARY OF THE INVENTION

The present invention solves the problems, and provides a technique that can realize various kinds of control operations of contents circulated by a network or broadcasting wave.

According to the invention, in a contents control system for controlling a process on the receiving side applied to contents transmitted from the transmitting side to the receiving side, the substance of the process applied to the contents on the receiving side is controlled by control information added to the contents upon transmission of the contents from the transmitting side to the receiving side.

In the contents control system of the invention, the transmitting side reads a predetermined block of contents to be transmitted to the receiving side, then examines whether the read block is an area where control information for controlling the substance of the process applied to the contents on the receiving side is added, and when the read block is the area where the control information is added, adds the control information of the contents to the block through a process such as digital watermark or encryption to transmit the contents from the transmitting side to the receiving side.

A receiving apparatus for receiving the transmitted contents receives from a user the substance of designation for a process applied to the contents transmitted from the transmitting side to the receiving side, receives the block of the contents transmitted from the transmitting side to the receiving side, examines whether user information or information concerning the receiving side apparatus which are stored in the receiving side apparatus satisfies a condition corresponding to the received process designation in the control information added to the block of the contents, and when the condition is satisfied, applies the process corresponding to the process designation to the received block.

The information stored in the receiving side apparatus may be information precedently stored in a storage area inside the apparatus during installation of the receiving side apparatus, information acquired by the receiving side apparatus from the transmitting side or the third party during reception of contents or before or after reception of contents, or information acquired by the receiving side apparatus concomitantly with authentication with the transmitting side or the third party during reception of contents or before or after reception of contents.

The process corresponding to the process designation is exemplified by a process for reproduction of contents, copy of contents, storage of contents in a non-processible area representing an area where edition of the contents is inhibited, storage of contents in a processible area representing an area where edition of the contents is permitted, display of attendant data accompanying contents such as the introduction of persons appearing on the contents, selection of an apparatus for transmission of contents, for example, selection of a camera photographing video data, or such bi-directional communication between the transmitting and receiving sides as an application for a prize in a television program.

For example, when the user wants to record and then edit video (moving picture) data on a transmitted television program, designation for storage of the video data in the processible area is received from the user and a block of the video data transmitted from the transmitting side to the receiving side is received.

The block referred to herein represents contents divided during transmission/reception by the transmitter/receiver, or a part of the contents. In the case of the contents being a video, for instance, the block represents a frame image inclusive of header part constituting the video, or a part of the frame image.

Then, conditions for level information of the user for which storage of the video data in the processible area is permitted are read out of the control information added to a block of the video data, it is then examined whether level information in the user information stored in the receiving apparatus satisfies the conditions for level information read out of the control information. If the conditions are satisfied, the block of the video data is stored in the processible area such as DVD-RAM, magnetic disk or the like. After completion of the storage in the processible area, the user can read and edit the stored video data.

The receiving side apparatus may examine whether the stored information concerning the user and transmission source, the information concerning the receiving side apparatus, or the information added to the block of the received contents satisfies the condition corresponding to the received process designation.

Then, after the condition for level information of the user for which storage of the video data in the processible area is permitted, user ID, receiving side ID, ID of the contents and ID of the transmission source of the contents are read out of the information added to the block of the video data, the receiving side apparatus may examine whether the information, such as user ID stored in the receiving side apparatus and for which the storage process is permitted, receiving side ID, ID of the contents for which the storage process is permitted or ID of the transmission source permitting the storage process, and the user ID, receiving side ID, contents ID and transmission source ID that are added to the contents satisfy the condition corresponding to the received storage designation, or may examine whether the level information in the user information stored in the receiving side apparatus satisfies the conditions for level information corresponding to the received storage designation.

When illegality for the received contents, that is, mismatching between the storage information in the receiving apparatus concerning the condition corresponding to the process designation and the information added to the contents, falsification of the received contents or modification and loss of the control information is examined. When any one of them is detected, the receiving side apparatus preferably stops the ensuing process. Further, information concerning the illegality, or information concerning the contents, transmission source or reception source may be notified to the transmitter side apparatus or the third party.

The control information in the invention represents one capable of controlling the process related to the contents, and for example, includes information for reproduction of contents, copy of contents, storage of contents in the non-processible area, storage of contents in the processible area, display of attendant data accompanying the contents, selection of an apparatus for transmission of the contents or control of bi-directional communication between the transmitting and receiving sides, and information such as the user ID, receiving side ID, conditions for level information of the user or transmission source ID of the contents.

As described above, in the present invention, when contents is transmitted from the transmitting side to the receiving side, the control information for controlling the contents is added to the contents, whereby even when the substance of the contents changes dynamically on real time base as in live broadcasting such as sports relay broadcasting or news distributed by a broadcasting wave, or when the condition of control operation changes for the initial broadcasting and re-broadcasting of the same contents, the control information can be changed in compliance with the change, thus ensuring that not only reproduction or copy control of static media type contents recorded in advance on a recording medium such as DVD can be carried out but also various kinds of control operations conforming to dynamic changes of contents can be performed. For example, during the live broadcasting, reproduction or copy control of contents is prevented from being carried out at a spot concerning a commercial of goods but copy inhibition or reproduction control of contents can be carried out successively at discretion of the broadcasting source at a spot concerning portrait rights of a performer and copyrights of a program per se.

As described above, according to the contents control system of the present invention, the substance of a process applied to contents on the receiving side is controlled by the control information added to the contents when the contents is transmitted from the transmitting side to the receiving side, thereby realizing various kinds of control operations of the contents circulated by the network or broadcasting wave.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 5 is a diagram showing an example of control information according to an embodiment of the invention.

FIG. 6 is a diagram showing an outline of information addition to contents according to an embodiment of the invention.

FIG. 11 is a diagram showing the schematic construction when the contents transmitting apparatus 100 is applied to a camera according to an embodiment of the invention.

FIG. 12 is a diagram showing a method for addition of control information according to an embodiment of the invention.

DETAILED DESCRIPTION OF THE EMBODIMENTS

The disclosures of all articles and references, including patent documents, mentioned in this application are incorporated herein by reference for all purposes.

An embodiment of a contents control system for controlling a process on the receiving side applied to contents which are transmitted from the transmitting side to the receiving side will now be described.

Figure 1:
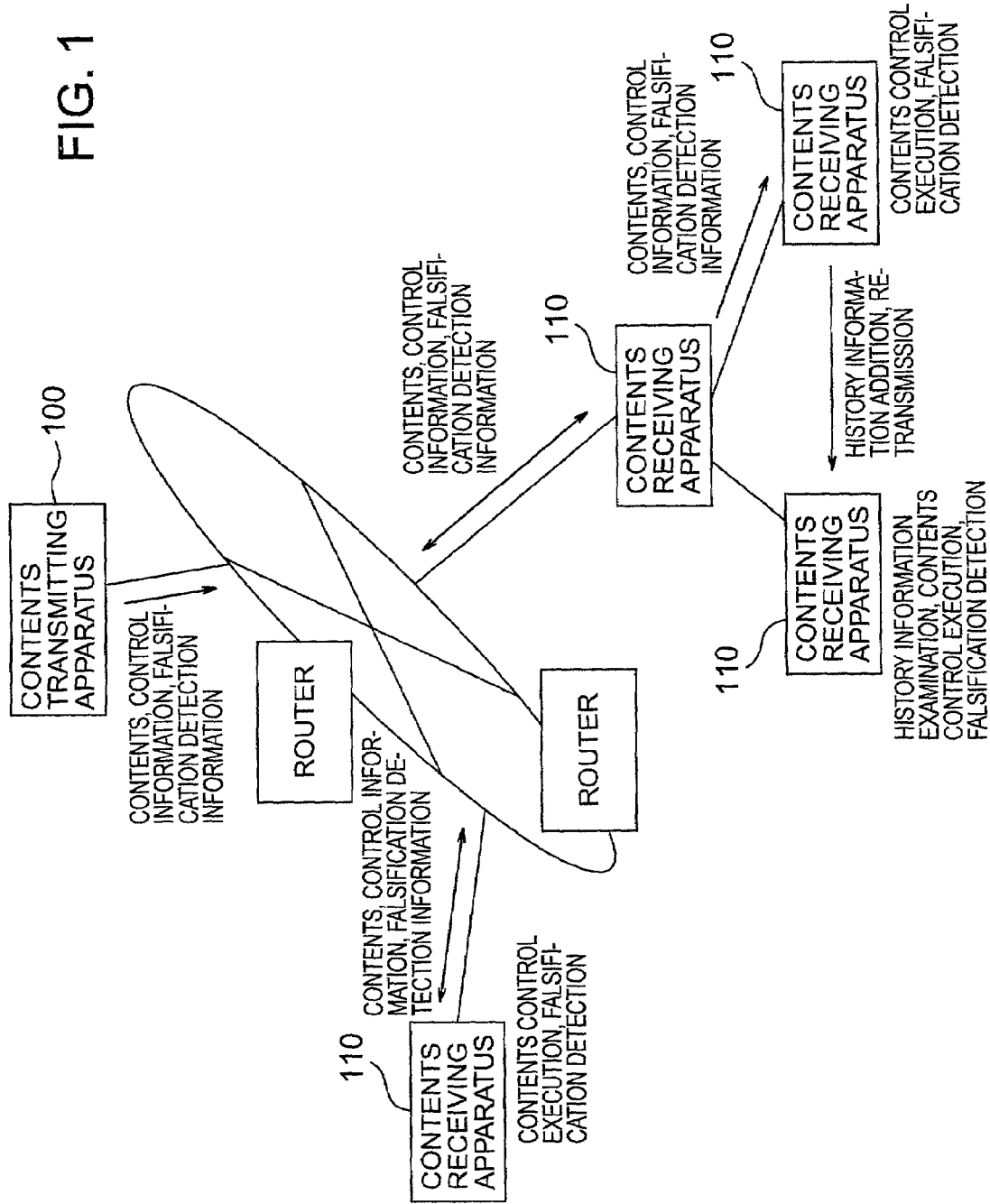
FIG. 1 is a diagram showing schematic construction of a contents control system according to an embodiment of the invention.

FIG. 1 is a diagram showing schematic construction of the contents control system according to the present embodiment. As shown in FIG. 1, the contents control system of the present embodiment includes a contents transmitting apparatus 100 and contents receiving apparatus 110.

The contents transmitting apparatus 100 is such an apparatus as server that transmits to the contents receiving apparatus 110 contents added with control information for controlling the contents, falsification detection needed/unneeded information, and falsification detection information. The contents receiving apparatus 110 is either an apparatus such as PC or settop box, or an apparatus such as mail server or router existing on a communication path, which receives the contents transmitted from the transmitting apparatus 100 to control the contents in accordance with the control information added to the contents, detect a falsification of the contents, or retransmit the contents to another receiving apparatus.

Figure 2:
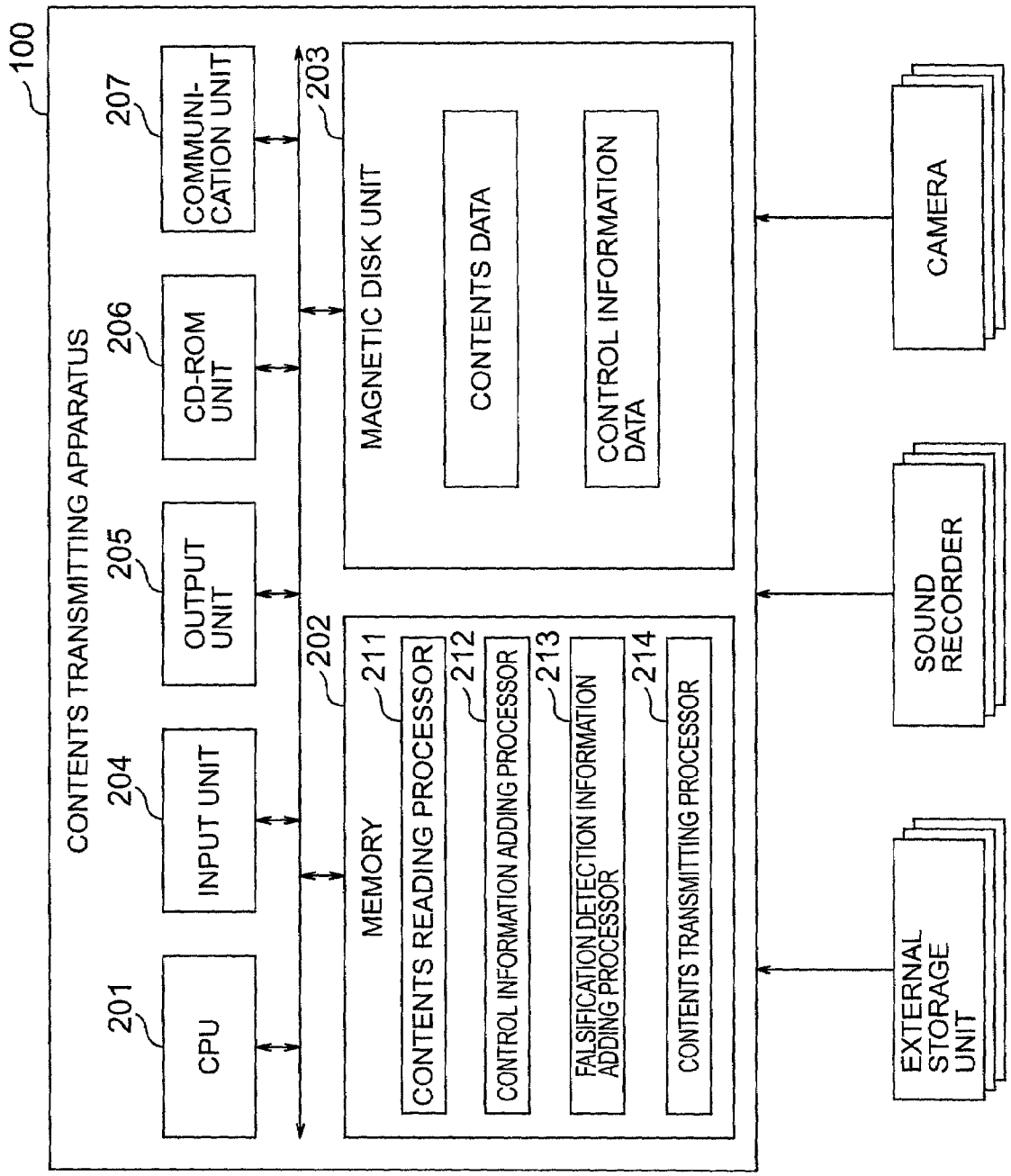
FIG. 2 is a diagram showing schematic construction of a contents transmitting apparatus 100 according to an embodiment of the invention.

FIG. 2 is a diagram showing schematic construction of the contents transmitting apparatus 100 in the present embodiment. As shown in FIG. 2, the contents transmitting apparatus 100 in the present embodiment includes a CPU 201, a memory 202, a magnetic disk unit 203, an input unit 204, an output unit 205, a CD-ROM unit 206 and a communication unit 207.

The CPU 201 is a unit for controlling the whole operation of the contents transmitting apparatus 100. The memory 202 is a storage unit that stores various processing programs and data necessary for controlling the whole operation of the contents transmitting apparatus 100.

The magnetic disk unit 203 is a storage unit for storing the various processing programs and contents data as well as control attribute data. The input unit 204 is a unit for performing various input operations necessary for transmission of the contents added with the control needed/unneeded information, control information, falsification detection needed/unneeded information and falsification detection information.

The output unit 205 is a unit for performing various output operations accompanying transmission of contents. The CD-ROM unit 206 is a unit for reading the substance of a CD-ROM recording the various processing programs. The communication unit 207 is a unit for communicating with another processing apparatus through the medium of a network such as Internet or intranet, or a broadcasting wave.

The contents transmitting apparatus 100 further includes a contents reading processor 211, a control information adding processor 212, a falsification detection information adding processor 213 and a contents transmitting processor 214.

The contents reading processor 211 is a processor adapted to read a predetermined block of contents which are transmitted from contents transmitting apparatus 100 to contents receiving apparatus 110. When the read block is an area where control information for controlling the substance of a process applied to the contents by the contents receiving apparatus 110 is added, the control information adding processor 212 operates as a processor that adds, to that block, control information necessary for reproduction of the contents, storage of the contents in a non-processible area, storage of the contents in a processible area, display of attendant data accompanying the contents, selection of an apparatus for transmission of the contents or by-directional communication between the transmitting and receiving sides, and information such as user ID, receiving side ID, conditions for level information of a user and transmission source ID of the contents.

When the predetermined block of the contents transmitted from the contents transmitting apparatus 100 to the contents receiving apparatus 110 is an area where the falsification detection needed/unneeded information indicative of need/non-need for falsification detection of the contents is added, the falsification detection information adding processor 213 operates as a processor that adds to that block a characteristic value of contents representing the falsification detection needed/unneeded information and falsification detection information necessary for performing falsification detection.

The contents transmitting processor 214 is a processor for transmitting the block of the contents, containing that block added with the control information, falsification detection needed/unneeded information and falsification detection information, from the contents transmitting apparatus 100 to the contents receiving apparatus 110.

A program for causing the contents transmitting apparatus 100 to function as the contents reading processor 211, control information adding processor 212, falsification detection information adding processor 213 and contents transmitting processor 214 is recorded on a recording medium such as CD-ROM and stored in a magnetic disk and thereafter loaded on the memory so as to be executed. The recording medium for recording the program may be a different one other than the CD-ROM. Alternatively, the program may be installed from the recording medium to an information processing apparatus such as PC and then used or the recording medium may be accessed via a network to use the program. Further, the program may be loaded on the information processing apparatus from an external server via the network.

FIG. 11 is a diagram showing schematic construction of the transmitting apparatus of the present embodiment when it is applied to a photographing apparatus (camera). As shown in FIG. 11, the apparatus includes a CPU 801, a memory 802, a contents storing unit 803, an input unit 804, an output unit 805 and a communication unit 806.

The CPU 801 is a unit for controlling the whole operation of the camera. The memory 802 is a storage unit for storing various processing programs and data necessary for controlling the whole operation of the camera, and is also used as a storage area for storing the programs and data, contents data and control attribute data.

The contents storing unit 803 is a storage unit for storing contents data prevailing before and after addition of the control information. The data may sometimes be stored in a storage medium such as contents storing tape, by means of the storage unit 803.

The input unit 804 reads image and voice contents through a lens or microphone, and besides performs a process for reading various kinds of information including the information concerning control need/non-need for the contents, control substance, falsification detection need/non-need and falsification detection as well as information concerning control of the camera per se, through an external apparatus.

The output unit 805 is a unit for performing various output operations accompanying transmission of contents. The communication unit 806 receives various kinds of information including the information concerning control need/non-need for the contents, control substance, falsification detection need/non-need and falsification detection and the information concerning control of the camera per se.

Figure 3:
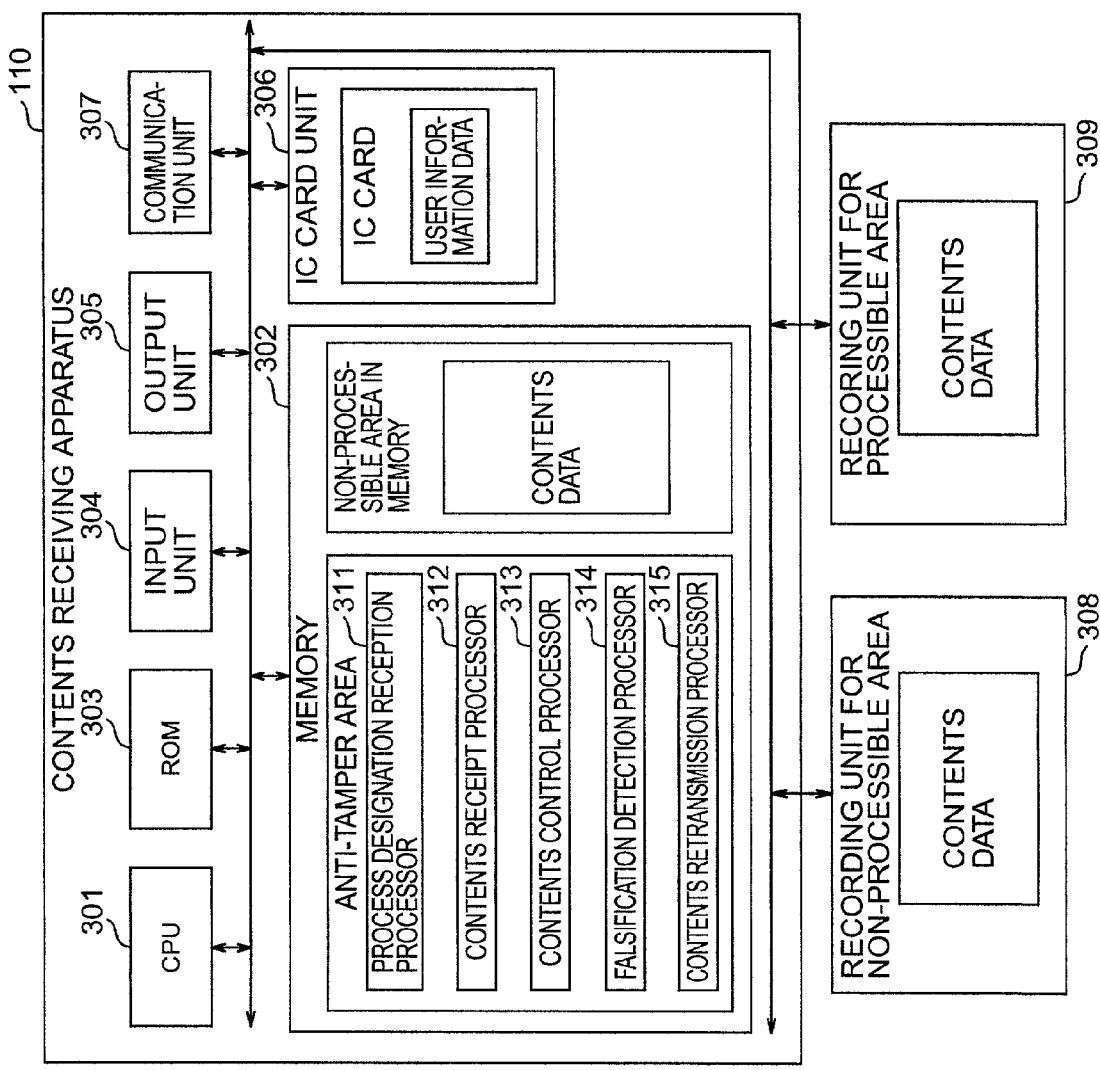
FIG. 3 is a diagram showing schematic construction of a contents receiving apparatus 110 according to an embodiment of the invention.

FIG. 3 is a diagram showing schematic construction of the contents receiving apparatus 110 in the present embodiment. As shown in FIG. 3, the contents receiving apparatus 110 in the present embodiment includes a CPU 301 a memory 302, a ROM 303, an input unit 304, an output unit 305, an IC card unit 306, a communication unit 307, a unit for non-processible area 308 and a unit for processible area 309.

The CPU 301 is a unit for controlling the whole operation of the contents receiving apparatus 110. The memory 302 is a storage unit for storing various processing programs and data necessary for controlling the whole operation of the contents receiving apparatus 110.

The ROM 303 is a storage unit for storing the various processing programs and data. The input unit 304 is a unit for performing various input operations necessary for receiving and processing contents added with the control information, falsification detection needed/unneeded information and falsification detection information.

The output unit 305 is a unit for outputting image and voice of the received contents. The IC card unit 306 is a unit for reading/writing an IC card storing user information including level information of a user of the contents receiving apparatus 110.

The communication unit 307 is a unit for communicating with another processing apparatus through the medium of a network such as Internet or intranet. The non-processible area unit 308 is, for example, an external unit or a magnetic disk built in a receiver that performs storage of contents using a recording medium of write once read many type, such as CD-R, as non-processible area where edition of the contents is inhibited.

A technique of realizing a non-processible area by limiting access to a specified area of the magnetic disk unit is disclosed in Information Technology AT Attachment with Packet Interface-5 (ATA/ATAPI-5 Working Draft), pp177-178, for instance.

The processible area unit 309 is, for example, an external unit or the magnetic disk built in the receiver that performs storage of contents by using a rewritable recording medium, such as DVD-RAM, as a processible area where edition of contents is permitted.

The contents receiving apparatus 110 further includes a process designation reception processor 311, a contents receipt processor 312, a contents control processor 313, a falsification detection processor 314 and a contents retransmission processor 315.

The process designation reception processor 311 is a processor for receiving, as designation for a process applied to contents transmitted from contents transmitting apparatus 100 to contents receiving apparatus 110, designation for execution of reproduction of the contents, copy of the contents, storage of the contents in the non-processible area, storage of the contents in the processible area, display of attendant data accompanying the contents, selection of an apparatus for transmission of the contents or by-directional communication between the transmitting and receiving sides.

The contents receipt processor 312 is a processor for receiving a block of contents transmitted from contents transmitting apparatus 100 to contents receiving apparatus 110 or contents retransmitted from another receiving apparatus. When user information stored in the contents receiving apparatus 110 that has received the contents satisfies conditions corresponding to the received process designation in the control information added to the block of the contents, the contents control processor 313 operates to apply a process corresponding to the process designation to the received block.

When a falsification of contents is detected by the falsification detection needed/unneeded information and falsification detection information added to the contents transmitted from contents transmitting apparatus 100 to contents receiving apparatus 110, the falsification detection processor 314 operates to stop the process corresponding to the process designation and applied to the contents. The contents retransmission processor 315 is a processor for re-transmitting the contents received by the contents receiving apparatus 110 to another receiving apparatus.

A program for causing the contents receiving apparatus 110 to function as the process designation reception processor 311, contents receipt processor 312, contents control processor 313, falsification detection processor 314 and contents retransmission processor 315 is recorded on a recording medium such as ROM so as to be executed. The recording medium for recording the program may be one other than the ROM. Alternatively, the program may be installed from the recording medium to the information processing apparatus and used, or the recording medium may be accessed through the network so as to use the program. Further, the program may be loaded on the information processing apparatus from an external server via the network.

In the present embodiment shown in FIG. 3, the individual processors of the contents receiving apparatus 110 are housed in an anti-tamper area. Even when transmission/reception of contents is carried out by the transmission/reception function utilizing an OS and the general-purpose function of an application on the OS in the case of the contents receiving apparatus being a PC, access to the contents is to be performed via the individual processors housed in the anti-tamper area.

Figure 4:
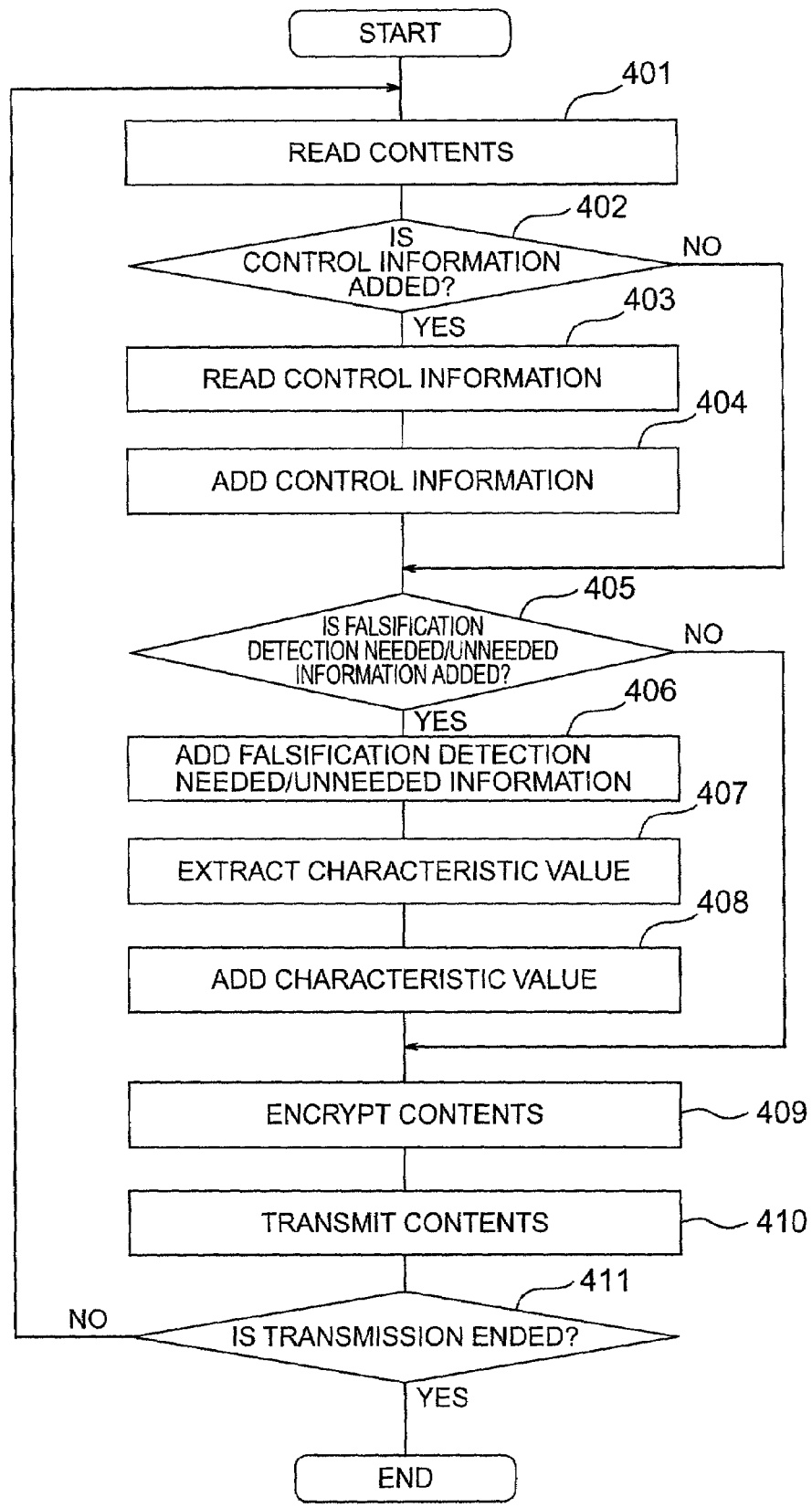
FIG. 4 is a flowchart showing the processing procedure in a contents transmitting process according to an embodiment of the invention.

FIG. 4 is a flowchart showing the processing procedure in a contents transmitting process in the present embodiment. When the time for starting distribution of contents is up or designation for distribution of contents from the operator is received, the contents transmitting apparatus 100 carries out a process for transmission of the contents by consulting data indicative of a distribution schedule of the contents. In case the contents transmitting apparatus is a photographing apparatus (camera), two cases are conceivable including an instance in which the transmitting process is carried out simultaneously with photographing and an instance in which the contents photographed is once stored by means of a contents storage unit inside the photographing apparatus, and is then subjected to the transmitting process.

The contents reading processor 211 of the contents transmitting apparatus 100 shown in FIG. 2 reads in step 401 contents from a storage unit such as magnetic disk unit or external storage unit storing the contents transmitted from contents transmitting apparatus 100 to contents receiving apparatus 110 or from a sound recorder or video recorder (camera) recording the contents on real time base. In an operation for reading a predetermined area in this step 401, a process for simply developing a data area of the contents (a header part of the contents in the case of header detection) on the memory is carried out.

In step 402, the control information adding processor 212 examines whether the read block is an area to be added with control information necessary for controlling the substance of a process applied to the contents by the contents receiving apparatus 110. If the area is for being added with the control information, the flow proceeds to step 403. It is now assumed that the block to be added with the control information is blocks at intervals of predetermined time or a specified block determined in advance.

In the process in the step 402, a decision is made by detecting a digital watermark of the data area developed on the memory (in the case of header detection, the rule of the header part is searched or data or media information in the header of the contents is acquired).

In the step 403, either the control information for controlling the reproduction of the contents, copy of the contents, storage of the contents in the non-processible area, storage of the contents in the processible area, display of attendant data accompanying the contents, selection of an apparatus for transmission of the contents or bi-directional communication between the transmitting and receiving sides, or the information such as user ID, receiving side ID, conditions for level information of a user or transmission source ID of the contents is read out of the magnetic disk unit 203 or fetched from the input unit 204. The thus read control information is added to the contents in the step 403.

In case different control information is added to the contents in advance and such a process as retransmission of the contents is carried out by the contents transmitting apparatus 100, a process is done in which the control information is detected and information such as the number of retransmission operations updated in accordance with a condition indicated by the detected control information is added to the contents.

FIG. 5 is a diagram showing an example of the control information added to the contents in the present embodiment. As shown in FIG. 5, the control information added to the contents stores, in addition to direct control information including the information for the reproduction of contents, storage in the non-processible area, storage in the processible area, display of attendant data accompanying the contents, selection of an apparatus for transmission of the contents, bi-directional communication between the transmitting and receiving sides or retransmission of the contents, indirect control information indicative of conditions for level information of a user for which the control is permitted.

The conditions for level information of the user may be replaced with conditions concerning a location/region where the receiving apparatus is installed, user ID of the receiving apparatus, terminal ID on the receiving side or transmission source ID of the contents, but the conditions and ID's may otherwise be used in combination with the conditions for level information. For example, on the assumption that "level 1" described in FIG. 5 is for "A country or B country" and "level 2" and "level 3" also described in FIG. 5 are for "A country", the reproduction of the contents is permitted for a receiver installed in "A country or B country", but the storage of the contents in the non-processible area is permitted for a receiver installed in "A country" only.

Further, by replacing the "A country" and "B country" with "terminal A" and "terminal B" on the receiving side, respectively, it can be designated terminal by terminal or user by user whether a process applied to the contents is permitted or inhibited.

During transmission of contents, the time for transmission of the contents, effective period of the contents or information related to the both can be added to the contents in addition to the control information. In this case, a receiver that has received the contents can collate the information concerning the time and effective period detected from the contents with time information on the receiver and perform control of inhibition or permission of reproduction/storage for contents for which a constant period has passed from transmission or contents for which the effective period has expired.

The conditions for storage of contents may include a condition that storage of the data amount corresponding to how much of time can be permitted. In other words, by controlling buffering to the contents storage area, a condition that the user can pause playback of the contents for how much of time can be included.

The retransmission of contents referred to herein indicates a condition for the contents receiving apparatus 110 receiving the contents to be permitted to retransmit the contents to another receiving apparatus through the network. In FIG. 5, when the contents is stored in the non-processible area, retransmission is permitted twice at the most for a user of level 5 or more, and when the contents is stored in the processible area, the contents is considered to be modified and its retransmission is inhibited. In case the contents does not undergo any modification, it is desirable that the contents be circulated more widely as in the case of previews of movies and be played back by more users and therefore, retransmission of the contents may be permitted indefinite times.

The control information shown in FIG. 5 is set in advance contents by contents. However, it may be changed immediately before transmission or during transmission of contents, or different kinds of control information may be set for the initial transmission and the second and ensuing repeat transmission. Further, different kinds of control information may be set part by part in contents, so that permission or inhibition of transmission of contents can be changed part by part in the contents.

In step 404, the block read in the step 401 is added with the read control information as digital watermark. In this phase, the control information may be encrypted so as to be added as a header of the block.

In the step 404, addition based on digital watermark and addition to the header may be used in combination. A processing method when the addition methods are used in combination will be exemplified with reference to FIG. 12.

As shown in FIG. 12, in method 1, a control need/unneeded flag is added to contents in the form of a watermark, and control information is added to the header part of contents.

In method 2, the control need/unneeded flag is added in the form of a digital watermark as in the case of method 1, but electronic signature for control information and contents is created by using a secret key and added to the header. In this manner, validity on the transmitting side for the control information and contents can be guaranteed.

In addition to the direct control information including the information for such a process as reproduction of contents, storage in non-processible area or storage in the processible area, the control information shown in FIG. 12 may include the indirect control information indicative of the conditions for level information of a user concerning the process, user ID of the receiving apparatus, terminal ID on the receiving side or transmission source ID of the contents.

In method 3, control information is added to a header similarly to the method 1, but an electronic signature or characteristic value (Hash value) of the control information added to the header is added in the form of a digital watermark to the control information by using a secret key on the transmitting side. In the method 3, the presence or absence of the signature or Hash value per se plays the role of control needed/unneeded flag, but the control needed/unneeded flag may be added independently in the form of a watermark.

In the method 2, a characteristic value such as Hash value of contents may be used in place of the contents.

Figure 14:
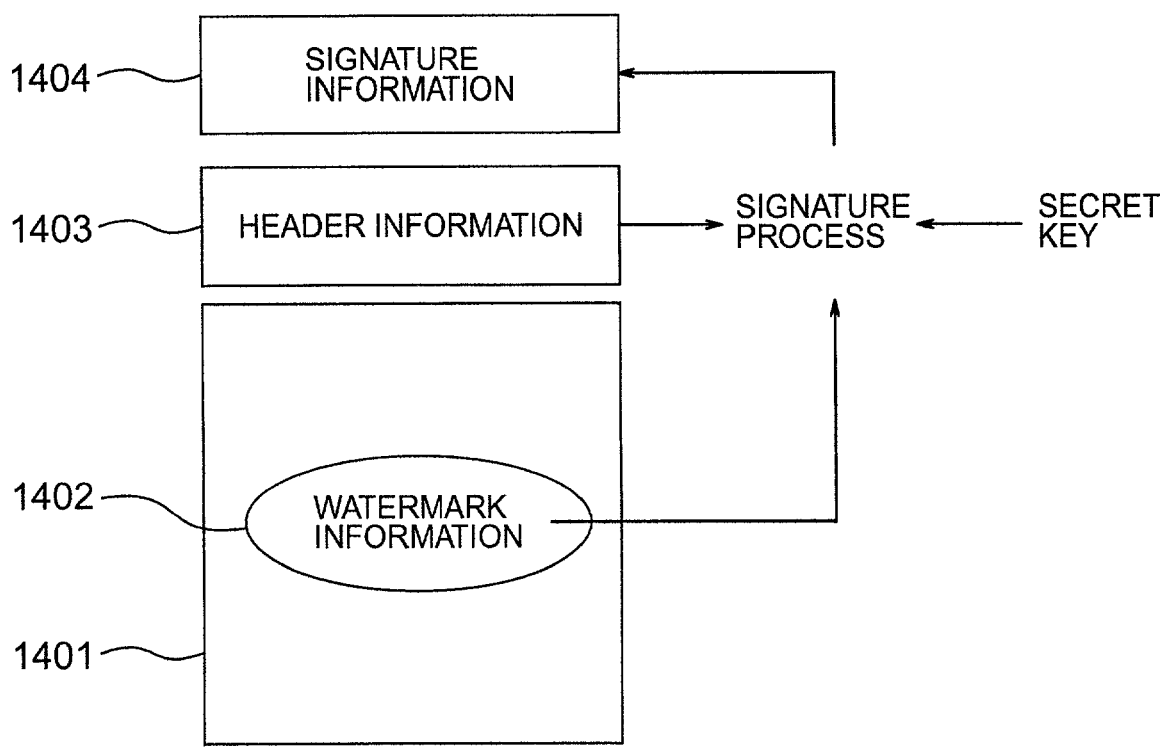
FIG. 14 is a diagram showing another method for addition of control information according to an embodiment of the invention.

In another example (referred to as "method 4"), as shown in FIG. 14, optional information may be added to contents 1401 as watermark information 1402 based on digital watermark, and other optional information may be added to the contents 1401 as header information 1403. Further, an electronic signature for the watermark information 1402, header information 1403 or a part thereof may be created using the secret key of the transmission source and may be added to the contents 1401 as signature information 1404. Thereby, validity of the header information 1403 for the contents 1401 can be verified by the watermark detection and signature verification.

As will be seen from the above, the target of the signature added to the header differs for the methods 2 and 4. In other words, in the method 2, the contents per se or the characteristic value such as Hash value is the signature target, whereas in the method 4, the watermark information 1402 added to the contents is the target of signature.

When, for watermark added contents subjected to a media process such as D/A/D conversion, compression such as MPEG or JPEG and filter processing, validity of header information 1403 added to the contents is required to be verified, the method 4 is effective. In other words, the signature verification by the method 2 is directed to a method of confirming matching between the characteristic value extracted from the contents and the decrypted signature information. Therefore, there is a possibility that the characteristic value is caused to change through the media processing to affect the verification of the signature. In the method 4, however, the watermark information added to the contents is used for signature verification. Therefore, the chance of causing the watermark information to be changed through the media processing or causing the change to affect the verification can be suppressed sufficiently.

Also, in the method 4, optional information can be assigned to the watermark information 1402 and header information 1403 as described hereinbefore. As an example, the watermark information 1402 may be contents ID and the header information 1403 may be control information. By adding the contents ID and a signature for the control information to the header as the signature information 1404 during transmission and by confirming matching between the signature information decrypted by a public key of the transmission source, contents ID detected in the form of watermark, and the control information added to the header during reception, validity of control for the contents can be verified.

The control information exemplified in FIG. 12 and the method 4 is not limited to the direct control information for the process of reproduction of contents, storage in the non-processible area and storage in the processible area, but may include the indirect information concerning the above control such as conditions for level information of the user concerning the process and user ID of the receiving apparatus, terminal ID on the receiving side, ID of the contents per se and transmission source ID of the contents.

The aforementioned Hash value indicates a pseudo-random sequence created from a given character string or binary information string through a unidirectional function. Even when the contents is converted through the media conversion such as JPEG compression or MP3 compression in accordance with the method 3, validity of the contents and control information can be guaranteed.

Next, in step 405, the falsification detection information adding processor 213 examines whether the aforementioned read block is an area where the falsification detection needed/unneeded information indicative of need/non-need of falsification detection of the contents is added. If the block is the area to be added with the falsification detection needed/unneeded information, the flow proceeds to step 406. The block to be added with the falsification detection needed/unneeded information referred to herein is blocks at intervals of predetermined time or a specified block determined in advance, and may also be the same block as that added with the control information.

In the step 406, bit information representing the falsification detection needed/unneeded information indicative of need/non-need for detection of falsification of the contents is added to the block read in the step 401, in the form of a digital watermark.

As described above, in the present embodiment, the falsification detection needed/unneeded information is added in the form of a digital watermark. For example, with a method for adding the falsification detection needed/unneeded information to a header part of contents considered, when a detection system applied with the method inputs contents originally unprovided with any header part and unneeded for falsification detection, it is impossible to decide whether the falsification detection is needed or unneeded for the contents. But when all contents circulating on the system are provided with the header part without fail, addition of the falsification detection needed/unneeded information can be realized by making a rule in information of the header part.

In step 407, the Hash value for a predetermined area of the contents where the falsification detection needed/unneeded information is embedded as digital watermark, or all or partial area of the contents having no relation to the predetermined area is calculated as a characteristic value of that block. When the control information is embedded as digital watermark in the same block as that embedded with the digital watermark of the falsification detection needed/unneeded information, a characteristic value also containing the digital watermark of control information is calculated. Therefore, falsification detection for the control information can be carried out simultaneously in this case. In step 408, the thus calculated characteristic value is added to the header of that block as falsification detection information. In this phase, the characteristic value may be encrypted or may be applied with an electronic signature by means of the contents transmitting apparatus 100 to improve security of header information.

In step 409, the contents transmitting processor 214 applies such a process as encryption or scramble to the whole of the block in order to prevent tapping or the like on the network. Conceivably, the third party illegally cumulates the encrypted contents on the way of the network and repetitively inputs the illegally cumulated contents to a receiving apparatus, thus reproducing unauthorized playback many times. To cope therewith, in the present embodiment, the encryption is carried out with a throwaway key, or the encryption key is changed at predetermined intervals during transmission of the contents.

In step 410, a block of the contents containing the block added with the information concerning the control, falsification detection needed/unneeded information and falsification detection information is transmitted from contents transmitting apparatus 110 to contents receiving apparatus 110.

In step 411, it is examined whether transmission of the block of a part permitted by added control information in the contents in transmission at present is ended. If transmission of the block is ended, transmission of the contents ends. But, if there is contents that has not been transmitted yet, the flow returns to the step 401 so that the process for transmission of contents may continue.

In case many receivers make a request to the contents transmitting apparatus 100 for transmitting the same contents simultaneously or at intervals of short time, and the transmitting apparatus 100 adds such information as ID corresponding to each receiver or control information to the same contents to transmit it to the many receivers within a short period of time, the step 404 is performed as follows.

Figure 9:
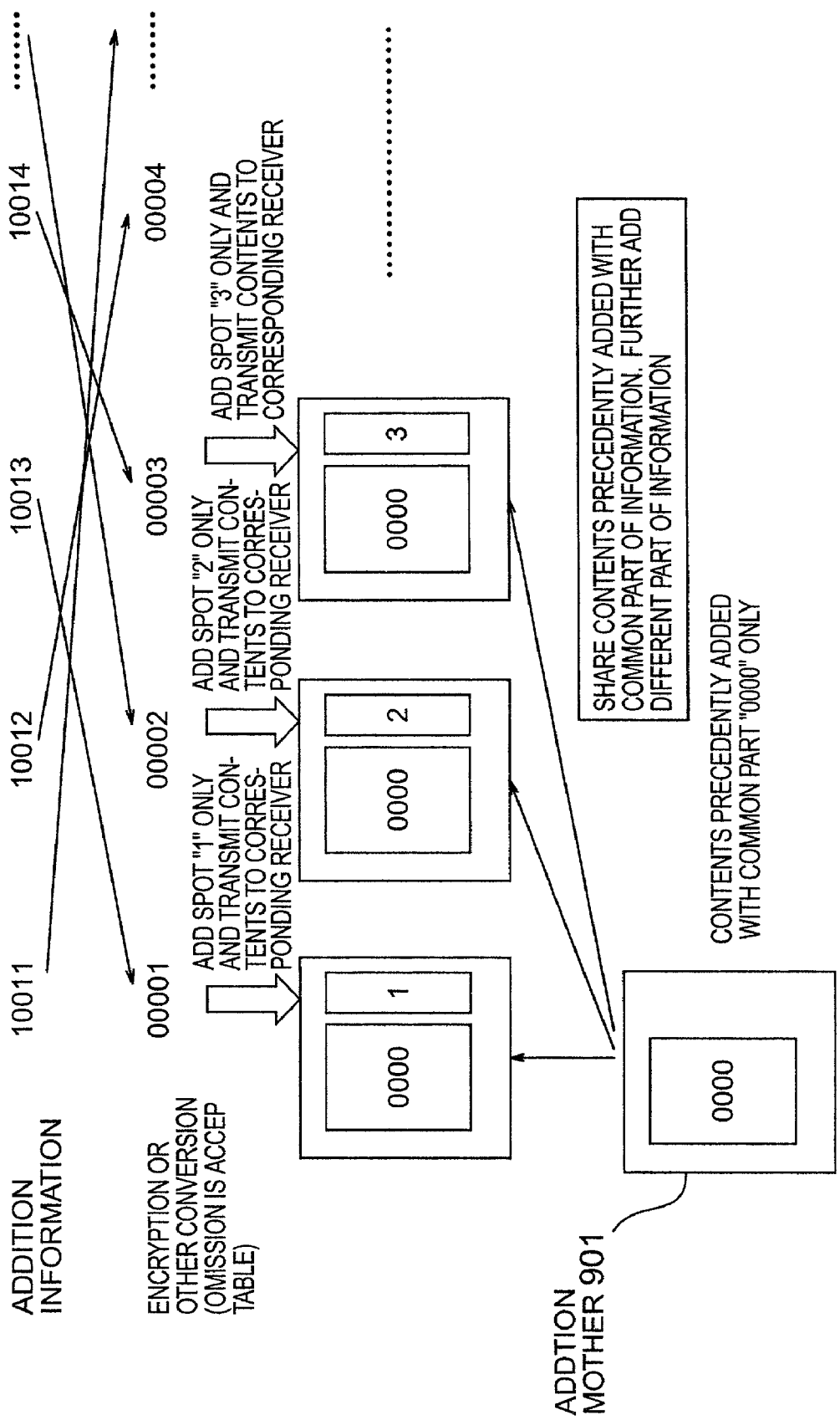
FIG. 9 is a diagram showing another method for information addition to contents according to an embodiment of the invention.

As shown in FIG. 9, the transmitting apparatus forms an addition mother 901 in advance by adding a common part of information corresponding to the all or a plurality of receivers to the contents in the form of a digital watermark. During addition of part of the information that differs for individual receivers, only difference information other than the common part is added to the addition mother 901. By using the addition mother 901 added with the common part of information corresponding the plural receives in this manner, a process for addition of the information corresponding to many receivers can be lightened.

Figure 10:
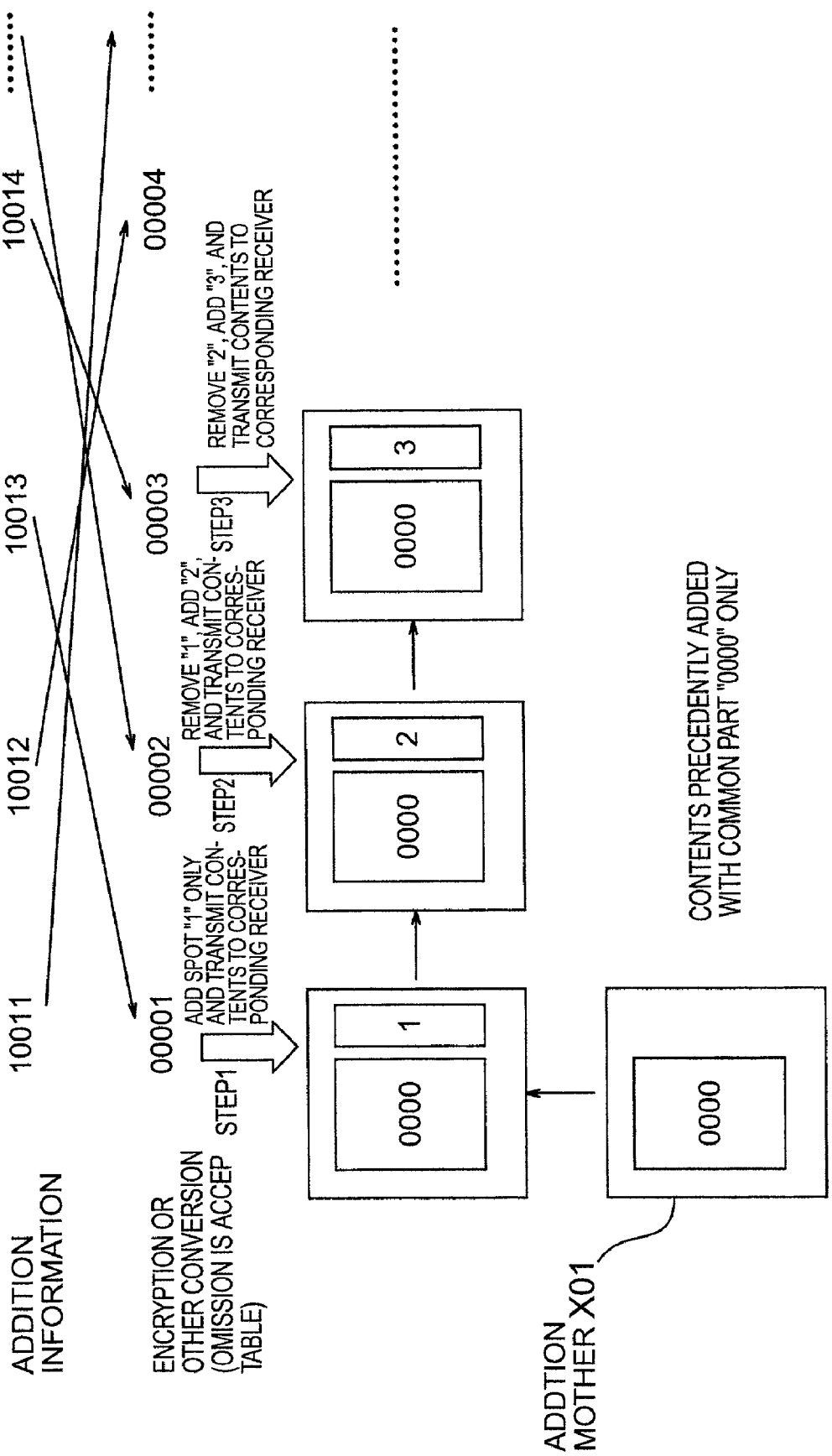
FIG. 10 is a diagram showing still another method for information addition to contents according to an embodiment of the invention.

As shown in FIG. 10, in the process for addition of the information corresponding to each receiver, contents applied with an addition process of information corresponding to another receiver may be used as an input to the addition process of the difference information, and difference information corresponding to a new receiver may be added by removing the added difference information.

In FIGS. 9 and 10, the addition mother 901 may be created by applying encryption conversion, for instance, to the control information such as terminal ID corresponding to each receiver, extracting a common part in the information after conversion, and adding the common part to the contents. The encryption conversion is not always necessary, but other conversion in which the common part is increased through conversion may be employed. Conversion may otherwise be excluded. The information addition to the contents is exemplified as being based on digital watermark, but a method may be used in which the information is added to the header part of contents.

Also conceivably, after completion of transmission of the contents, a person having right to the contents requests to apply, to the transmitted contents, new contents control that has not been added to the transmitted contents. To respond to the request, information for identifying that contents and information concerning the new control applied to that contents are transmitted to the receiving apparatus after the request has been made by the right holder, and the receiving apparatus stores the information in a storage area that is non-processible by the user. After the storage of the control information, the receiving apparatus collates the information added to the contents with contents specifying information in the storage area during reception of new target contents, and applies to contents in question a new control operation using the control information in the storage area. In some cases, the received contents can be applied with control based on control information received afterwards.

FIG. 6 is a diagram showing an outline of addition of information to contents in the present embodiment. As shown in FIG. 6, in the present embodiment, the information necessary for the control is added to contents in the form of a digital watermark or header. Falsification detection needed/unneeded information is embedded as digital watermark in a block and falsification detection information is added as header.

In the figure, video data means a frame of video. In one example in FIG. 6, watermark information is inserted in a data area of contents, and in another example, information is added to a header area. In the data area, different areas are selected frame by frame to insert the watermark information in a selected area, and in the header area, the information is added in its specified area.

Figure 7:
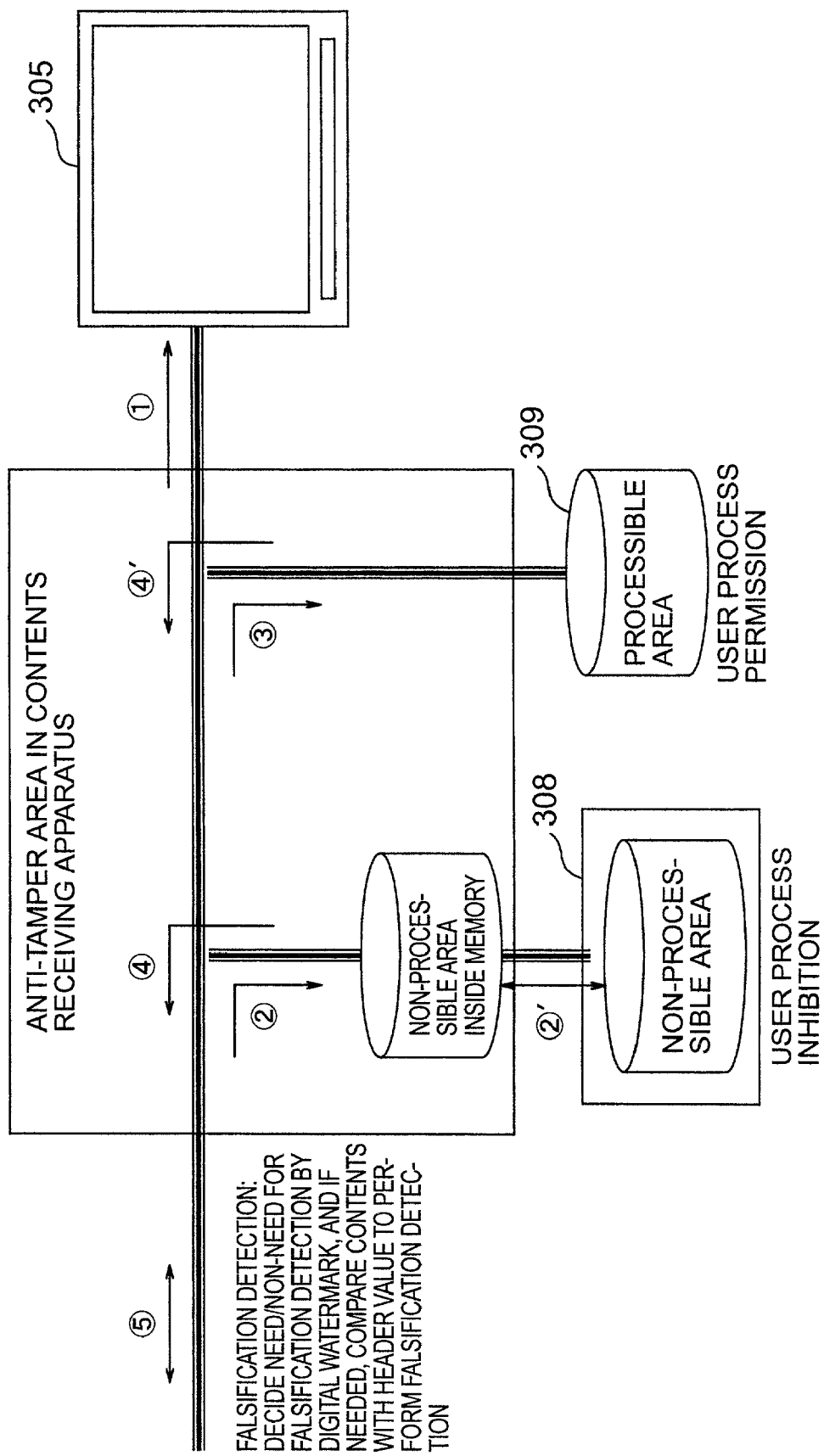
FIG. 7 is a diagram showing an outline of a process in a contents receiving apparatus 110 according to an embodiment of the invention.

FIG. 7 is a diagram showing an outline of a process in the contents receiving apparatus 110 in the present embodiment. As shown in FIG. 7, the contents receiving apparatus 110 according to the present embodiment performs reproduction of contents shown at (1), storage in the non-processible area inside the memory shown at (2), storage in the external non-processible area shown at (2)', storage in the external processible area shown at (3), retransmission of contents shown at (4) and (4)', and falsification detection of contents shown at (5). These numerals parenthesized by ( ) mean numerals enclosed by ○ in FIG. 7.

When the power source is turned on, the contents receiving apparatus 110 according to the present embodiment causes the process designation reception processor 311 to start, in accordance with designation for processing of contents transmitted from the contents transmitting apparatus 100 to the contents receiving apparatus 110, a process of receiving, from the user, designation for execution of reproduction of contents, copy of contents, storage in the non-processible area, storage in the processible area, display of attendant data accompanying the contents, selection of an apparatus for transmission of the contents, or bi-directional communication between the transmitting and receiving sides, and causes the contents receipt processor 312 to perform a process for receiving the contents transmitted from the content transmitting apparatus 100.

Figure 8:
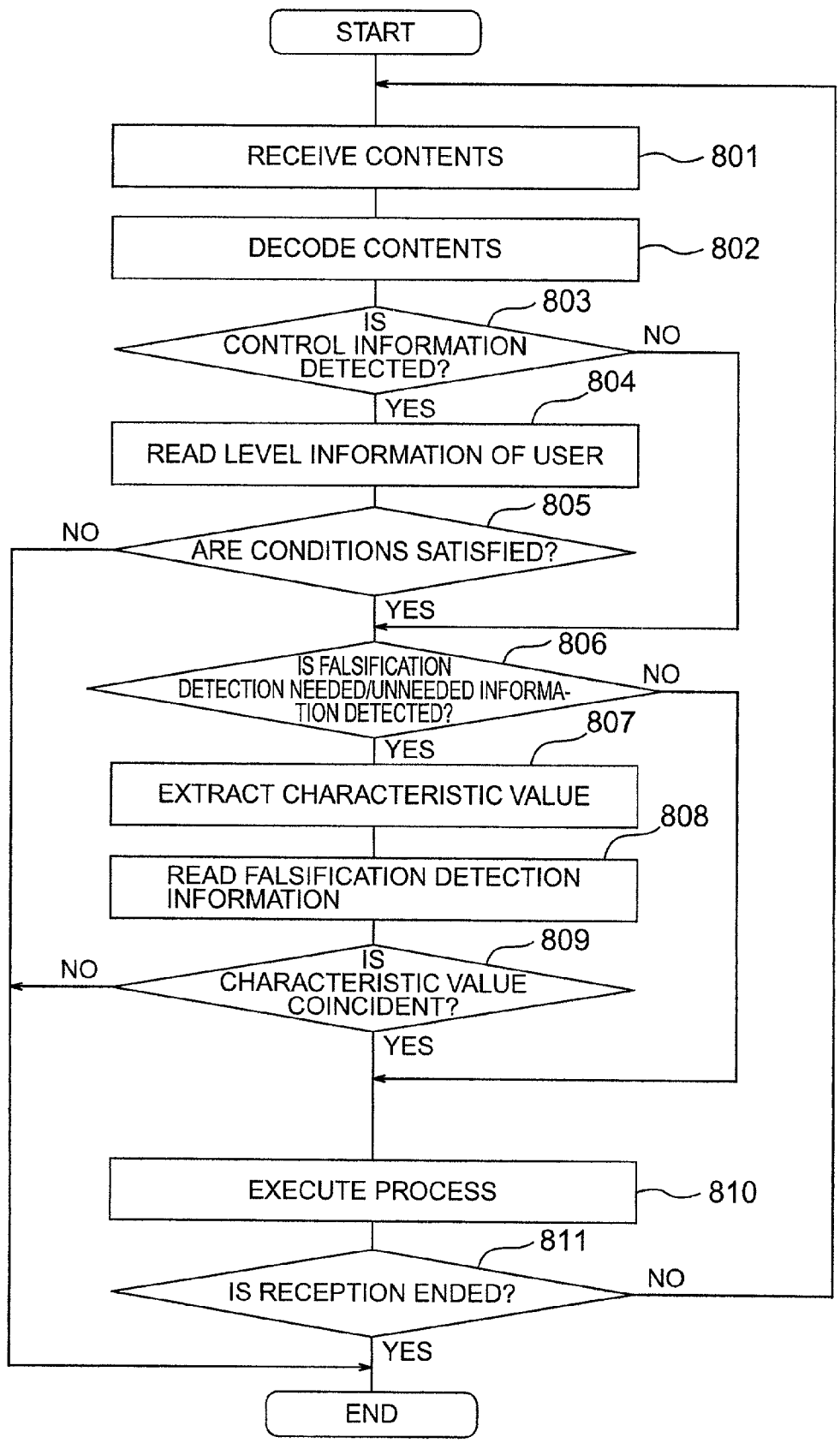
FIG. 8 is a flowchart showing the processing procedure in a contents receiving process according to an embodiment of the invention.

FIG. 8 is a flowchart showing the process procedure in a contents receiving process in the present embodiment. As shown in FIG. 8, in step 801, the contents receipt processor 312 of the contents receiving apparatus 110 receives a block of contents transmitted from the contents transmitting apparatus 100 to the contents receiving apparatus 110.

In step 802, the received block is decoded and de-scrambled using a decoding key received after an authentication process is carried out between the contents receiving apparatus and the contents transmitting apparatus 100 upon start of reception.

In the authentication process, in addition to reception of the decoding key from the transmitting apparatus, the receiving apparatus 110 may receive conditions corresponding to designation for individual processes on the receiving side (information such as ID of contents for which the process is permitted, terminal ID, and ID of transmission source that permits the process), and may store the conditions in the storage area of the receiver.

In step 803, the contents control processor 313 consults the received block to examine whether information such as contents ID, terminal ID and transmission source ID, and control information such as the substance of process on the receiver side and conditions for level information of the user are added in the form of a digital watermark or header. If the information is added, the control information is read and the flow proceeds to step 804.

Figure 13:
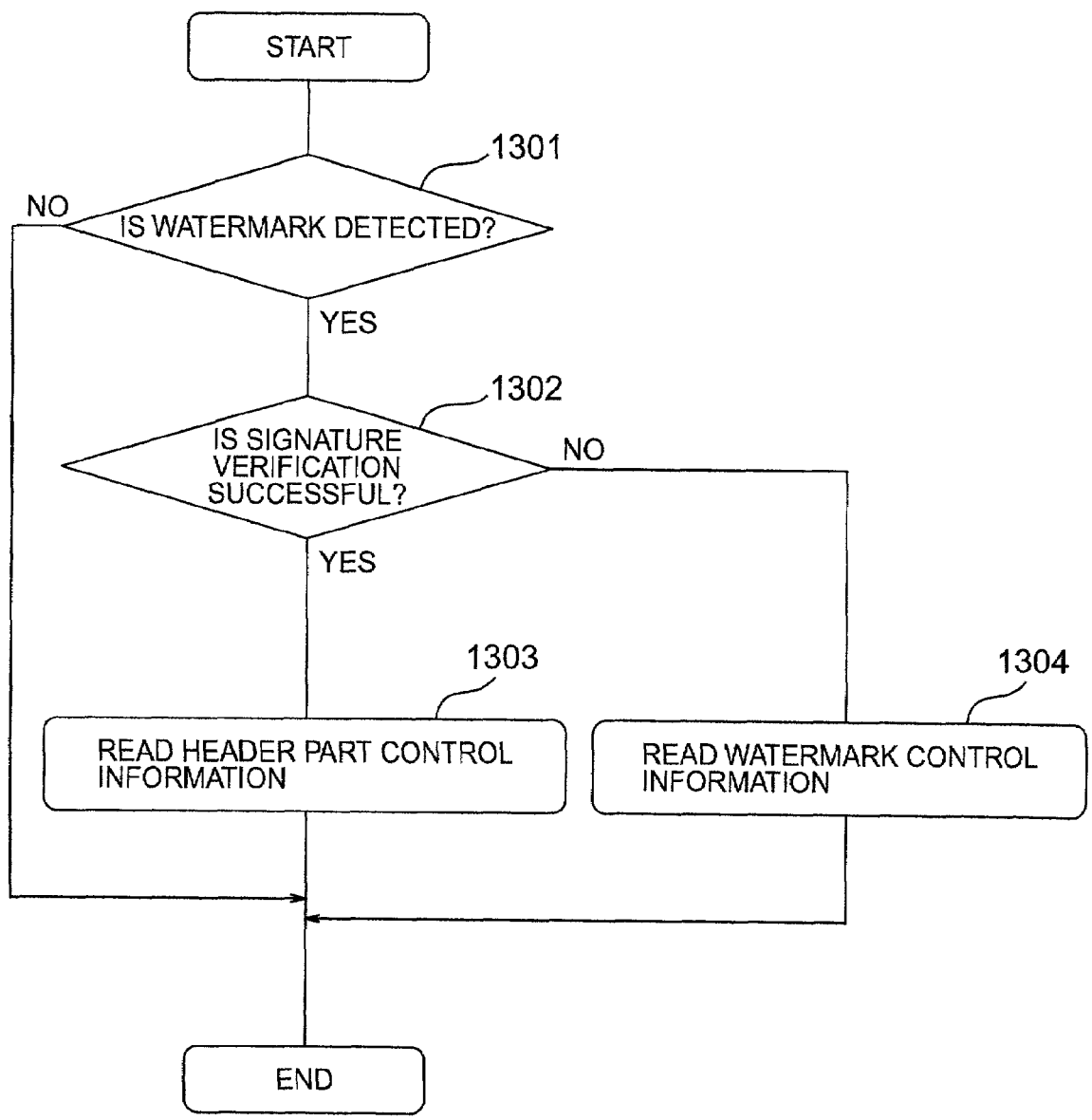
FIG. 13 is a flowchart showing the processing procedure in a contents receiving process in which addition of control information in the form of a digital watermark and addition to a header are used in combination according to an embodiment of the invention.

FIG. 13 is a flowchart showing the process procedure in the step 803 when the control information of the contents is added in the form of digital watermark and header used in combination, indicating an example of the process procedure in case the addition is carried out through the "method 3" in FIG. 12.

In step 1301, detection of the watermark is conducted in respect of the contents to examine whether an electronic signature for control information made by the transmitting apparatus, Hash value of the control information or control needed/unneeded flag is added. With the information added, "need for control" is determined and the flow proceeds to step 1302. If the information is not added, non-need for control is determined and read of the control information in the header part is not carried out.

Instead of deciding the need/non-need for control in accordance with the presence/absence of the information, the need/non-need for control may be determined in accordance with the substance of the added information.

In the step 1302, it is verified whether the read signature for control information or Hash value either matches the control information in the header part or is the authorized control information added by the transmitting apparatus.

If the verification is successful, the flow proceeds to step 1303 where the control information in the header part is read.

If the verification fails, it is determined that the control information is modified or lost, and the flow proceeds to step 1304 where control information during unauthorized operation is read out of the watermark information or the storage area of the receiving apparatus.

The processing sequence of the steps 1301, 1302 and 1303 is not always needed to be that shown in FIG. 13, and reading of the header part control information in the step 1303 may first be carried out.

The control information shown in FIG. 13 is not limited to the direct control information such as information for a process of reproduction of contents, storage in the non-processible area or storage in the processible area, but may be the indirect control information indicative of conditions for level information of the user concerning the process, ID of the user of the receiving apparatus, terminal ID on the receiving side or transmission source ID of the contents.

In the step 804, either an IC card inserted in the IC card unit 306 of the contents receiving apparatus 110 that has received the block or user information or information concerning location, area and time stored in the non-processible area inside the memory in the receiving apparatus is consulted to read the ID of the user about to utilize the contents, level information of the user, information concerning location/area where the receiving apparatus is installed, and time information.

The level information in the user information is determined in accordance with a playback condition that is determined by the user taking a utilization charge into account when the user purchases the contents receiving apparatus 110 and contracts a contents provider for playback, and it is stored in an IC card of the user. As shown in FIG. 5, in the present embodiment, the substance of a process applicable to the contents increases each time the level increases to permit various kinds of control operations to be executed. Therefore, a charging system may be conceivable in which the fee rises each time the level increases.

For the contract, a contract with a plurality of contents providers is possible which may be made through an agency. When the user makes a contract with the plurality of contents providers concurrently with joining, the agency creates an IC card storing a plurality of playback conditions and forwards it to the user. When the user makes a contract with a specified contents provider and thereafter makes a contract with another contents provider, the playback conditions for the user are updated by an IC card writer of the STB. This working may be executed by the agency.

In step 805, of the conditions in the control information read in the step 803, a condition corresponding to the process designation received by the process designation reception processor 311 is consulted to examine whether the level information of the user read in the step 804, the information concerning the location/area where the receiving apparatus is installed, and the time information satisfy the condition. In case the level information of the user satisfies the condition, the flow proceeds to step 806.

In the step 806, the falsification detection processor 314 consults the received block to examine whether the falsification detection needed/unneeded information is added in the form of a digital watermark. With the falsification detection needed/unneeded information added, the flow proceeds to step 807.

In the step 807, a characteristic value of the block is calculated. In step 808, the falsification detection information added to the header of the block is read.

In step 809, the characteristic value calculated from the block is compared with the falsification detection information read out of the header. When they are coincident with each other, the flow proceeds to step 810. But when they are non-coincident with each other and a falsification of the contents is detected, the process corresponding to the process designation and applied to the contents is stopped and error information is displayed on the display screen of a monitor or the like.

In the step 810, the contents control processor 313 applies to the aforementioned received block the process corresponding to the process designation received by the process designation reception processor 311.

In case a falsification of the contents is detected, the process designation received by the process designation reception processor 311 does not coincide with the process executed by the control processor 313 (when control permitted by the contents differs from control that has been carried out by the receiving apparatus), a falsification of the information stored in the non-processible area is made, or verification in the step 1302 fails and it is determined that there is modification of the control information or addition or loss of unauthorized control information, that is, in case unauthorized control not permitted by the receiving apparatus is conducted, the receiving apparatus transmits, to the transmitting apparatus representing the contents transmission source, the third party apparatus or a specified server, information concerning the unauthorized operation, ID of the receiving apparatus in which the unauthorized process is carried out, information for identifying the transmission source such as ID or IP address of the transmitting apparatus representing the transmission source or URL of a homepage in which the contents is not described or information such as contents ID, thereby notifying the occurrence of the unauthorized operation. When the notification destination cannot be specified or recognized, the information may once be stored in the user non-processible area of the receiving apparatus and the information may be transmitted at the time that the notification destination is specified.

For example, when the user records video data of a transmitted television program and thereafter edits it, the process designation reception processor 311 receives designation for storage of the video data in the processible area, from the user. Then, in the step 805, the contents control processor 313 consults a condition "level 4 or more" corresponding to "storage in the processible area" of the conditions in the control information shown in FIG. 5 read in the step 803. When the level information of the user read in the step 804 is the "level 4" or more, it performs falsification detection in accordance with the falsification detection needed/unneeded information. Then, in the step 810, it transmits data of the contents to the processible area unit 309 so as to store the contents in the processible area such as DVD-RAM. After completion of the contents in the processible area, the user can read and edit the stored video data.

In step 811, it is examined whether reception of the block of a part, permitted by the addition control information, of the contents being received at present is ended. With the reception of the block ended, reception of that contents ends. If contents that has not received yet exists, the flow returns to the step 801 to continue the process of receiving the contents.

In the present embodiment, the contents control processor 313 of the contents receiving apparatus 110 performs a process for adding, to the contents, history information indicative of the substance of a process applied to that contents.

For example, when contents is stored in the processible area such as DVD-RAM by using the processible area unit 309, information for identifying a recording medium of the processible area, information for identifying a user, information for identifying the substance of the process, and information of a date (year, month and day) on which the process is performed are added to the received block in the form of digital watermark or encryption.

When receiving designation for retransmission of contents from the user, the contents retransmission processor 315 of the contents receiving apparatus 110 reads the control information of the contents and information indicative of the number of retransmission operations in the previous history information, confirms that the latest number of retransmission operations is "1" or more and the retransmission is permissible, then adds a value obtained by decreasing "1" from the retransmission operation number, as a new retransmission operation number, to the history information. Thereafter, it transmits the read information a receiving apparatus representing a transmission destination designated by the user.

The contents receipt processor 312 of another contents receiving apparatus 110 receiving the retransmitted contents reads the control information and history information in the received contents, and examines whether there are discrepancies in these information.

For example, in case contents inhibited from being retransmitted when it is stored in the processible area is illegally retransmitted, a discrepancy takes place between information indicative of "retransmission inhibition" in "processible area" in the control information and information for identifying a recording medium in the history information, so that the contents receipt processor 312 can detect the discrepancy to stop the receiving process.

As described above, in the present embodiment, control information is added to contents when the contents is transmitted from the transmitting side to the receiving side. Thereby, even when the substance of contents changes dynamically on real time base as in the case of live broadcast such as sports relay broadcasting and news distributed by a broadcasting wave, or even when the condition for control is changed for the initial broadcasting and re-broadcasting of the same contents, the control information can be changed in conformity with the change. Thus, it is possible to perform not only reproduction or copy control of static medium type contents recorded in advance on a recording medium such as DVD but also various kinds of control operations that accord with dynamic changes of contents.

In the present embodiment, when information such as user ID, receiving side ID or transmission source ID stored in the contents receiving apparatus 110 receiving the contents and user ID, receiving side ID or transmission source ID added to the contents satisfy conditions corresponding to the received process designation, or when level information in user information stored on the receiving side apparatus satisfies a condition in level information read out of that information and corresponding to the received process designation, the contents control process 313 may apply a process corresponding to the process designation to the received block.

In this case, the receiving apparatus may select the condition (ID of contents permitted for the process, terminal ID, or ID of the transmission source permitting the process) corresponding to the received process designation from the storage area in the receiver in the step 805, and decide whether contents ID, terminal ID or transmission source ID read in the step 803 match the condition of interest. If they are matched with each other, the flow proceeds to the step 806. But, if they are unmatched, the process may be stopped.

Even when unauthorized control inhibited by the receiving apparatus or the transmission source, that is, for example, when the information such as contents ID, terminal ID, or transmission source ID read out of the contents does not match the condition (ID of contents permitted by the process, terminal ID or ID of the transmission source permitting the process) corresponding to the process designation stored in the receiver in the step 805, a similar process may be carried out in the step 810.

As another example of information added to contents in the present embodiment, information concerning direct control may not be added to the contents, but only information concerning the contents ID, terminal ID on the receiving side, or transmission source ID may be added. In this case, information indicative of the sproces substance and the condition as shown in FIG. 5 is stored on the receiver side in the storage area of the receiving apparatus, the condition corresponding to the received process designation (ID of contents permitted by the process, terminal ID, or ID of the transmission source permitting the process) is selected from the storage area, and it is decided whether contents ID, terminal ID or transmission source ID added to the contents matches the condition. If they are matched with each other, the process is permitted for the contents. But, if they are unmatched, the process is stopped.

In the above example, when the substance of the process applied to the contents on the receiver side is so simple that a desired process is permitted or inhibited, the receiver is not always needed to store list information of the process substance and the condition as shown in FIG. 5, and it suffices that only information such as ID of contents for which the desired process is permitted in the receiver, terminal ID, or ID of the transmission source permitting the process be stored.

In the above example, the contents ID, receiver ID or transmission source ID corresponding to the substance of each process and stored on the receiver side may be information stored in the storage area inside the receiving apparatus in advance during installation of the receiver, information acquired from the transmission source or third party by the receiver during reception of contents or before or after reception of contents, or information acquired by the receiver concomitantly with authentication with the transmission source or third party during reception of contents or before or after reception of contents.

As has been described, according to the contents control system of the present embodiment, the process substance applied to contents on the receiving side is controlled by control information added to the contents when the contents are transmitted from the transmitting side to the receiving side. Therefore, various kinds of control operations of the contents circulated by a network or broadcasting wave can be realized.

According to the present invention, since the process substance applied to contents on the receiving side is controlled by control information added to the contents when the contents are transmitted from the transmitting side to the receiving side, various kinds of control operations of the contents circulated through a network or broadcasting wave can be realized.

The specification and drawings are, accordingly, to be regarded in an illustrative rather than a restrictive sense. It will, however, be evident that various modifications and changes may be made thereto without departing from the broader spirit and scope of the invention as set forth in the claims.

What is claimed is:

1. A contents control method for controlling a process on a receiving side which is applied to contents comprising a plurality of blocks transmitted from a transmitting side apparatus to the receiving side apparatus, comprising the steps of:

adding control needed/unneeded information indicative of need/non-need for control of the content to an area of one or more blocks of the content, and if and only if the control needed/unneeded information indicates "need for control" a step of adding first control information to said one or more blocks of the content at the transmitting side apparatus is performed, wherein said one or more blocks of the content is not equal to the whole content, and wherein said first control information is a watermark that specifies conditions for permitting processes to be applied to said one or more blocks of the content;

receiving and storing in a first location of the receiving side apparatus said content including the first control information added to said one or more blocks of the content transmitted from the transmitting side apparatus; and receiving by the receiving side apparatus a process designation corresponding to the content transmitted from the transmitting side apparatus to the receiving side apparatus, wherein second control information is stored in a second location of the receiving side apparatus, which receives the content transmitted from the transmitting side apparatus, wherein said second control information specifies condition for which applying processes to the content is permitted, and wherein the conditions specified by the second control information includes at least one type of information selected from a group consisting of user information of the user about to use the contents, location information of the receiving apparatus, area information of the receiving apparatus, and time information; and if and only if a condition specified by the second control information satisfies a condition corresponding to the process designation specified by the first control information, applying a process corresponding to the process designation to the received said one or more blocks of the content.

2. A contents control method according to claim 1, wherein as the process corresponding to the process designation, reproduction of said one or more blocks, copy of said one or more blocks, storage in a non-processible area, storage in a processible area, display of attendant data accompanying said one or more blocks, selection of an apparatus for transmission of said one or more blocks, or bi-directional communication between the transmitting side apparatus and the receiving side apparatus is carried out.

3. A contents control method according to claim 2,
wherein said control needed/unneeded information is falsification detection needed/unneeded information indicative of need/non-need for detection of a falsification of the content, and wherein said first control information is falsification detection information for performing the falsification detecting 4. A contents control method according to claim 3, further comprising:
detecting illegality to the received content on the receiving side apparatus; and
in case that illegality is detected, a step of stopping the process corresponding to the process designation and applied to the block of the content, and notifying information concerning the illegality to the transmitting side apparatus or a third party.

5. A contents control method according to claim 4, wherein in case that the condition specified by the second control information to apply the process corresponding to the process designation to the content does not satisfy the condition specified by the first control information to permit the process corresponding to the process designation, in case that a falsification of the content is detected by the falsification detection needed/unneeded information and the falsification detection information added to the received content, or in case that modification or loss of the first control information added to the content or the second control information stored in the receiving side apparatus are detected, detection of illegality is determined on the receiving side apparatus.

6. A contents control method according to claim 5, wherein the information to be notified includes any one or more of pieces of information concerning the falsification of the content, the modification of the first control information, the modification of the second control information stored in the receiving side apparatus, the received process designation, the content, transmitting side apparatus, and receiving side apparatus.

7. A contents control method according to claim 6, further comprising the steps of:
adding history information indicative of the process substance applied to said one or more blocks of the content;
re-transmitting the content with the history information from the receiving side apparatus to a second receiving side apparatus; and
in case of the history information contradictory to conditions of the first control information added to the re-transmitted content, stopping the process applied to the block of the re-transmitted content, and notifying information concerning the content, the transmitting side apparatus and the receiving side apparatus which re-transmits the content, to the second receiving side apparatus which receives the re-transmitted content ot the third party.

8. A contents control method according to claim 1, wherein the second information stored in the receiving side apparatus is information acquired by the receiving side apparatus from the transmitting side apparatus or a third party.

9. A contents control method according to claim 8, wherein the information acquired by the receiving side apparatus is information acquired concomitantly with authentication with the transmitting side apparatus or the third party.

10. A contents control system for controlling a process on a receiving side apparatus which is applied to a content comprising a plurality of blocks transmitted from a transmitting side apparatus to the receiving side apparatus, comprising:
a control information adding processor provided in the transmitting side apparatus for adding control needed/unneeded information indicative of need/non-need for control of the content to an area of one or more blocks of a content, and if and only if the control needed/unneeded information indicates "need for control", adding first control information to said one or more blocks of a content, wherein said one or more blocks of the content is not equal to the whole content, wherein said first control information is a watermark that specifies conditions for permitting processes to be applied to said one or more blocks of the content, and wherein the content including the first control information is transmitted from the transmitting side apparatus to the receiving side apparatus and stored in a first location of the receiving side apparatus;

a process designation reception processor provided in the receiving side apparatus for receiving a process designation corresponding to the content transmitted from the transmitting side apparatus to the receiving side apparatus, wherein second control information is stored in the receiving side apparatus which receives the content transmitted from the transmitting side apparatus, wherein said second control information specifies conditions for which applying processes to the content is permitted, and wherein the conditions specified by the second control information includes at least one type of information selected from a group consisting of user information of the user about ot use the contents, location information of the receiving apparatus, area information of the receiving apparatus, and time information; and a contents control processor provided in the receiving side apparatus for applying a process corresponding to the process designation to the received one or more blocks of the content, if and only if a condition specified by the second control information satisfies a condition corresponding to the process designation specified by the first control information.

11. A contents control system according to claim 10, wherein the contents control processor performs, as the process corresponding to the process designation, reproduction of the content, copy of the content, storage in a non-processible area, storage in a processible area, display of attendant data accompanying the content, selection of an apparatus for transmission of the content, or bi-directional communication between the transmitting side and the receiving side.

12. A contents control system according to claim 11, further comprising:

a falsification detection information adding processor for adding, falsification detection needed/unneeded information and falsification detection information for performing the falsification detection to the block, wherein the block of the content transmitted from the transmitting side apparatus to the receiving side apparatus has an area to which the falsification detection needed/unneeded information indicative of need/non-need for falsification detection of the content is added; and a falsification detection processor for stopping, in case that a falsification of the contents is detected by the falsification detection needed/unneeded information and the falsification detection information added to the content transmitted from the transmitting side apparatus to the receiving side apparatus, the process corresponding to the process designation and applied to the block of the content, and transmitting information concerning the falsification to the transmitting side apparatus or a third party.

13. A contents control system according to claim 12, wherein history information indicative of the process substance applied to the content is added to the content, and in case of the history information contradictory to conditions of the first control information, the process applied to the block of the content is stopped and information concerning the process is transmitted to the transmitting side apparatus or the third party.

14. A contents transmitting apparatus for transmitting contents from a transmitting side apparatus to a receiving side apparatus, comprising:

a contents reading processor for reading one or more blocks of a the content transmitted from the transmitting side apparatus to the receiving side apparatus;

a control information adding processor for adding control needed/unneeded information indicative of need/non-need for control of the content to an area of said one or more blocks of the content, and if and only if the control needed/unneeded information indicates "need for control", adding first control information to said one or more blocks of the content at the transmitting side apparatus, wherein said one or more blocks of the content is not equal to the whole content, wherein said first control information is a watermark that specifies conditions for permitting processes to be applied to said one or more blocks of the content, and wherein the content including the first control information added to said one or more blocks of the content transmitted from the transmitting side apparatus is received and stored in a first location if the receiving side apparatus; and a content tansmitting processor for transmitting the block of the content from the transmitting side apparatus to the receiving side apparatus, wherein a second location of said receiving side apparatus holds second control information for specifying conditions for which applying processes to the content permitted, so that a process corresponding to a process designation received by the receiving side apparatus is applied to said one or more blocks of the content, if and only if a condition specified by the second control information satisfies a condition corresponding to the process designation specified by the first control information, wherein the conditions specified by the second control information includes at least one type of information selected from a group consisting of user information of the user about to use the contents, location information of the receiving apparatus, area information of the receiving apparatus, and time information.

15. A contents transmitting apparatus according to claim 14, wherein the first control information is information for reproduction of the content, copy of the content, storage in a non-processible area, storage in a processible area, display of attendant data accompanying the content, selection of an apparatus for transmission of the content, or control of bi-directional communication between the transmitting side apparatus and the receiving side apparatus.

16. A contents transmitting apparatus according to claim 15, further comprising a falsification detection information adding processor for adding falsification detection of the content and falsification detection information for performing the falsification detection to the block of the contents transmitted from the transmitting side apparatus to the receiving side apparatus.

17. A content receiving apparatus for receiving content transmitted from a transmitting side apparatus to a receiving side apparatus, comprising:

a process designation reception processor for receiving, by the receiving side apparatus, a process designation corresponding to the content transmitted from the transmitting side apparatus to the receiving side apparatus;

a content receipt processor for receiving one or more blocks of the content transmitted from the transmitting side apparatus to the receiving side apparatus, wherein said one or more blocks of the content has an area to which control needed/unneeded information indicative of need/non-need for control of the content is added, and if and only if the control needed/unneeded the information indicates "need for control", in first control information, which is a watermark for specifying conditions for permitting a process to be applied to said one or more blocks of the content, is added to said one or more blocks of the content at the transmitting side apparatus, wherein said one or more blocks of the content is not equal to the whole content, and wherein the first control information added to said one or more blocks of the content transmitted from the transmitting side apparatus is received and stored in a first location of the receiving side apparatus, wherein second control information for specifying conditions for which applying a process to the content is permitted is stored in a second location of the receiving side apparatus, wherein the conditions specified by the second control information includes at least one type of information selected from a group consisting of user information of the user about to use the contents, location information of the receiving apparatus, area information of the receiving apparatus, and time information; and a content control processor for applying a process corresponding to the received process designation, the process corresponding to the process designation of the received one or more blocks, if and only of the condition specified by the second control information satisfies the condition corresponding to the process designation specified by the first control information.

18. A content receiving apparatus according to claim 17, wherein as the process corresponding to the process designation, reproduction of the content, copy of the content, storage in a non-processible area, storage in a processible area, display of attendant data accompanying the content, selection of an apparatus for transmission of the content, or bi-direction communication between the transmitting side apparatus and the receiving side apparatus is carried out.

19. A contents receiving apparatus according to claim 18, further comprising a falsification detection processor for stopping, in case that a falsification of the content is detected by falsification detection needed/unneeded information and falsification detection information added to the content transmitted from the transmitting side apparatus to the receiving side apparatus, the process corresponding to the process designation and applied to the content, and transmitting information concerning the falsification to the transmitting side apparatus or a third party.

20. A contents receiving apparatus according to claim 19, wherein when history information indicative of the process substance applied to the content is added to the content, and in case of the history information contradictory to conditions of the first control information added to the content transmitted from the transmitting side apparatus to the receiving side apparatus, the process to the contents is stopped and information concerning the process is transmitted to the transmitting side or the third party.

21. A computer program product having computer readable instruction code embodied on a computer readable storage medium, comprising:

instruction for reading one or more blocks of content transmitted from the computer to a receiving side apparatus;

instruction for adding control needed/unneeded information indicative of need/non-need for control of the content needed/unneeded information indicates "need for control",an instruction for adding first control information to said one or more blocks of the content at the transmitting side apparatus is executed, wherein said one or more blocks of the content is not equal to the whole content, and wherein said first control information is a watermark that specifies conditions for permitting processes to be applied to the content;

Instruction for receiving and storing in a first location of the receiving side apparatus said content including the first control information added to said one or more blocks of the content transmitted from the transmitting side apparatus; and instruction for transmitting said one or more blocks of the content from the computer to the receiving side apparatus, wherein a second location of said receiving side apparatus holds second control information for specifying conditions for which applying processes to the content is permitted, so that a process corresponding to a process designation received by the receiving side apparatus is applied to said one or more blocks of the content if and only if a condition specified by the second control information satisfies a condition corresponding to the process designation specified by the first control information, wherein the condition specified by the second control information includes at least one type of information selected from a group consisting of user information of the user about to use the contents, location information of the receiving apparatus, area information of the receiving apparatus, and time information.

22. A computer program product according to claim 21, wherein said one or more blocks of the content transmitted from the computer to the receiving side apparatus has an area to which falsification detection needed/unneeded information indicative of need/non-need for falsification detection of the content is added, further comprising:

instruction for adding the falsification detection needed/unneeded information and falsification detection information for performing the falsification detection to the block of the content.

23. A computer program product having computer readable instruction code embodied on a computer readable storage medium, comprising:

instruction for receiving by a computer a process designation concerning content transmitted from a transmitting side apparatus to the computer;

instruction for receiving one or more blocks of the content transmitted from the transmitting side apparatus to a first location of the computer, wherein said one or more blocks of the content is not equal to the whole content, wherein said one or more blocks of the content has an area to which control neede/unneeded information indicative of need/non-need for control of the content is added, and if and only if the control needed/unneeded information indicates "need for control", and instruction for adding first control information to said one or more blocks of the content is executed.

wherein said first control information, is a watermark for specifying conditions for permitting processes to be applied to the content, wherein the computer stores ina second location second control information for specifying conditions for which applying processes to the content is permitted, wherein the conditions specified by the second control information includes at least one type of information selected from a group consisting of user information of the user about to use the contents, location information of the receiving apparatus, area information of the receiving apparatus, and time information; and instruction for applying a process corresponding to the process designation to the received one or more blocks of the content, if and only if a condition specified by the second control information satisfies a condition specified corresponding to the process designation by the first control information.

24. A computer program product according to claim 23, further comprising:

instruction for stopping, in case that a falsification of the content is detected by falsification detection needed/unneeded information and falsification detection information added to the content transmitted from the transmitting side apparatus to the computer, the process corresponding to the process designation and applied to the content, and transmitting information concerning the falsification to the transmitting side apparatus or a third party.

25. The computer program product according to claim 24, wherein history information indicative of the process substance applied to the content is added to the content, further comprising:

in case of the history information contradictory to the conditions of the first control information is added to the content transmitted from the transmitting side apparatus to the computer, instruction for stopping the process applied to the content and transmitting information concerning the process to the transmitting side apparatus or the third party.

* * * * *